US006981102B2

(12) United States Patent
Beardsley et al.

(10) Patent No.: US 6,981,102 B2
(45) Date of Patent: Dec. 27, 2005

(54) METHOD AND SYSTEM FOR MANAGING META DATA

(75) Inventors: Brent Cameron Beardsley, Tucson, AZ (US); Michael Thomas Benhase, Tucson, AZ (US); Douglas A. Martin, Tucson, AZ (US); Robert Louis Morton, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/269,507

(22) Filed: Oct. 11, 2002

(65) Prior Publication Data

US 2003/0051113 A1 Mar. 13, 2003

Related U.S. Application Data

(63) Continuation of application No. 09/261,683, filed on Mar. 3, 1999, now Pat. No. 6,502,174.

(51) Int. Cl.[7] .............................................. G06F 12/06

(52) U.S. Cl. ...................... 711/141; 711/152; 711/151; 711/170

(58) Field of Search ........................ 711/170, 154, 152, 711/163, 118, 150, 141, 151; 707/202, 205, 707/10, 100; 710/56

(56) References Cited

U.S. PATENT DOCUMENTS

| | | | | |
|---|---|---|---|---|
| 4,888,681 | A | 12/1989 | Barnes et al. | 707/101 |
| 4,987,533 | A | 1/1991 | Clark et al. | 707/204 |
| 5,237,682 | A | 8/1993 | Bendert et al. | 707/204 |
| 5,448,719 | A | 9/1995 | Schultz et al. | 707/205 |
| 5,452,444 | A | 9/1995 | Solomon et al. | 714/6 |
| 5,488,731 | A | 1/1996 | Mendelsohn | 711/114 |
| 5,524,203 | A | 6/1996 | Abe | 714/6 |

(Continued)

FOREIGN PATENT DOCUMENTS

JP 7073085 3/1995

(Continued)

OTHER PUBLICATIONS

Ng et al., Uniform Parity Group Distribution in Disk Arrays with Multiple Failures, IEEE transactions on Computers, vol. 43, No. 4, Apr., 1994.*

(Continued)

*Primary Examiner*—Pierre-Michel Bataille
(74) *Attorney, Agent, or Firm*—David W. Victor; Konrad Raynes & Victor LLP

(57) ABSTRACT

Disclosed is a method, system, and article of manufacture for managing meta data. The meta data provides information on data maintained in a storage device. The system receives a request for meta data from a process and determines whether the requested meta data is in cache. After determining that the requested meta data is not in cache, the system determines whether there are a sufficient number of allocatable segments in cache to stage in the meta data and allocates segments in cache to store the meta data after determining that there are enough allocatable segments in cache. The system stages the requested meta data into the allocated segments. Alternatively, after determining that the requested meta data is in cache, the system determines whether a second process has exclusive access to the meta data in cache. After determining that the second process does not have exclusive access, the system indicates to the first process that access to the meta data is permitted. Otherwise, after determining that the second process has exclusive access, the system notifies the first process that access to the meta data track will be provided at a later time when the second process relinquishes exclusive access.

51 Claims, 16 Drawing Sheets

U.S. PATENT DOCUMENTS

| | | | | |
|---|---|---|---|---|
| 5,533,190 | A | 7/1996 | Binford et al. | 714/6 |
| 5,572,660 | A | 11/1996 | Jones | 714/6 |
| 5,594,836 | A | 1/1997 | Ryu et al. | 706/53 |
| 5,636,359 | A | 6/1997 | Beardsley et al. | 711/122 |
| 5,644,766 | A | 7/1997 | Coy et al. | 707/204 |
| 5,675,781 | A | 10/1997 | Duncan et al. | 711/152 |
| 5,748,874 | A | 5/1998 | Hicksted et al. | 714/24 |
| 5,787,243 | A | 7/1998 | Stiffler | 714/13 |
| 5,835,955 | A | 11/1998 | Dornier et al. | 711/162 |
| 5,884,098 | A * | 3/1999 | Mason, Jr. | 711/113 |
| 5,889,934 | A * | 3/1999 | Peterson | 714/6 |
| 6,065,102 | A * | 5/2000 | Peters et al. | 711/151 |
| 6,128,627 | A * | 10/2000 | Mattis et al. | 707/202 |
| 6,219,693 | B1 * | 4/2001 | Napolitano et al. | 709/203 |
| 6,298,425 | B1 * | 10/2001 | Whitaker et al. | 711/162 |

FOREIGN PATENT DOCUMENTS

| | | |
|---|---|---|
| WO | 9321579 | 10/1993 |

OTHER PUBLICATIONS

IBM Technical Disclosure Bulletin; Destage Algorithm Transitions with Redundant Arrays of Independent Disks; vol. 38, No. 10, Oct. 1995.

Research Disclosure; Non-Retentive Data Identifier (NRDID); Feb. 1989, No. 298.

U.S. Appl. No. 09/261,824 filed Mar. 3, 1999 (18.40).

U.S. Appl. No. 09/261,898 filed Mar. 3, 1999 (18.46).

* cited by examiner

METHOD AND SYSTEM FOR MANAGING META DATA

CROSS-REFERENCE TO RELATED APPLICATIONS

This application is a continuation application of U.S. patent application Ser. No. 09/261,683, filed on Mar. 3, 1999, having U.S. Pat. No. 6,502,174, which patent application is incorporated herein by reference in its entirety.

This application is related to the co-pending and commonly-assigned patent application entitled “A Method and System For Recovery of Meta Data in a Storage Controller,” U.S. Pat. No. 6,438,661, to Brent C. Beardsley, Michael T. Benhase, Douglas A. Martin, R. L. Morton, Kenneth W. Todd, which application is incorporated herein by reference in its entirety.

FIELD OF THE INVENTION

The present invention relates to a method for managing meta data in cache and using meta data to access customer data.

BACKGROUND OF THE RELATED ART

Computing systems often include one or more host computers (“hosts”) for processing data and running application programs, direct access storage devices (DASDs) for storing data, and a storage controller for controlling the transfer of data between the hosts and the DASD. In addition to storing actual data, also known as user or customer data, the control unit often maintains meta data which provides information on tracks or blocks of data in the DASD or in a cache of the storage controller. The storage controller processes the meta data during certain operations on the actual data represented by the meta data to improve the speed and efficiency of those requested operations.

There are numerous types of meta data, such as summary information, partial-copy information, historical information, copy services information, and log structured array information. Summary information summarizes the customer data, including information on the format of a block or track of customer data, such as a count-key-data (CKD) track. In this way, information on the actual customer data that would otherwise have to be gleaned from the customer data in a time consuming process is readily available. Partial copy information contains a copy of a portion of the actual customer data to improve destage performance. Historical information records historical usage of the customer data. Historical data may be used to predict future use of the user or customer data. Copy services information contains bit maps that indicate tracks of the customer data that were modified and not yet copied to a secondary site. The log structured array (LSA) information maintains an LSA directory and related data to manage the LSA.

Typically, during initialization of the DASD, meta data is copied from the DASD to the storage controller. As the size of a meta data track and the types of meta data maintained increases, an ever increasing amount of cache storage and processing capacity is dedicated to meta data, to the exclusion of other types of data. In addition, because cache storage is volatile (data stored in cache will be lost in the event of a power loss), some conventional computing systems save meta data that has been modified in cache into separate, battery-backed-up, non-volatile storage units (NVS) for recovery purposes. Such implementations add additional costs and overhead by consuming processor and memory resources to maintain and update the meta data in NVS.

To conserve NVS capacity, some computing systems will not back-up meta data in NVS. The problem with not providing an NVS backup is that microcode errors, power loss, and other error conditions may cause some or all of the meta data stored in cache to become invalid or lost. In such case, the storage controller must rebuild the meta data from the actual data in the DASD. This process of recovering lost meta data can be time-consuming, as meta data often represents thousands of customer tracks. In conventional computing systems when modified meta data is not backed-up into NVS, lost meta data is rebuilt in a piecemeal process every time its associated customer data is staged into cache for other purposes. The need to rebuild the meta data delays the recovery of meta data and also degrades data processing operations.

Thus, there is a need in the art for an improved method and system for managing meta data.

SUMMARY OF THE INVENTION

To provide an improved system for managing meta data, preferred embodiments provide a method, system, and article of manufacture for managing meta data. The meta data provides information on data maintained in a storage device. The system receives a request for meta data from a process and determines whether the requested meta data is in cache. After determining that the requested meta data is not in cache, the system determines whether there are a sufficient number of allocatable segments in cache to stage in the meta data and allocates segments in cache to store the meta data after determining that there are enough allocatable segments in cache. The system stages the requested meta data into the allocated segments.

In further embodiments, the system receives a request for meta data from a first process and determines whether the meta data is in cache. After determining that the requested meta data is in cache, the system determines whether a second process has exclusive access to the meta data in cache. After determining that the second process does not have exclusive access, the system indicates to the first process that access to the meta data is permitted. Otherwise, after determining that the second process has exclusive access, the system notifies the first process that access to the meta data track will be provided at a later time when the second process relinquishes exclusive access.

In yet further embodiments, a system processes a request to end track access to a meta data track from a process. A queue includes access requests to a meta data track. The system receives a request from the process to terminate access to the meta data track and determines whether the process requesting to terminate access has exclusive access to the meta data track. The system processes the queue to select an access request and grants access to the meta data track to the selected access request. The system determines whether the selected access request is for exclusive access to the meta data track. After determining that the previous selected access request is not for exclusive access, the system grants access to the meta data track to an additional selected access request in the queue. In preferred embodiments, the requests in the queue are processed until all requests are processed or a request is made for exclusive access.

With preferred embodiments, meta data is paged into cache on demand to improve cache utilization and minimize cache memory requirements. Further, the track identifier or address of modified meta data is stored into NVS to maintain information on the meta data tracks that were modified and avoid consuming NVS storage space with the actual meta data. Preferred embodiments further provide mechanisms to serialize access requests to a meta data track and process access requests when another processing unit has exclusive access to the meta data track. Preferred embodiments further provide mechanisms for determining whether a process requesting meta data will wait for the meta data to become available in cache if segments are unavailable for the meta data or another process has exclusive access to the meta data.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which illustrate several embodiments of the present invention. It is understood that other embodiments may be utilized and structural changes may be made without departing from the scope of the present invention.

Hardware and Software Environment

Figure 1:
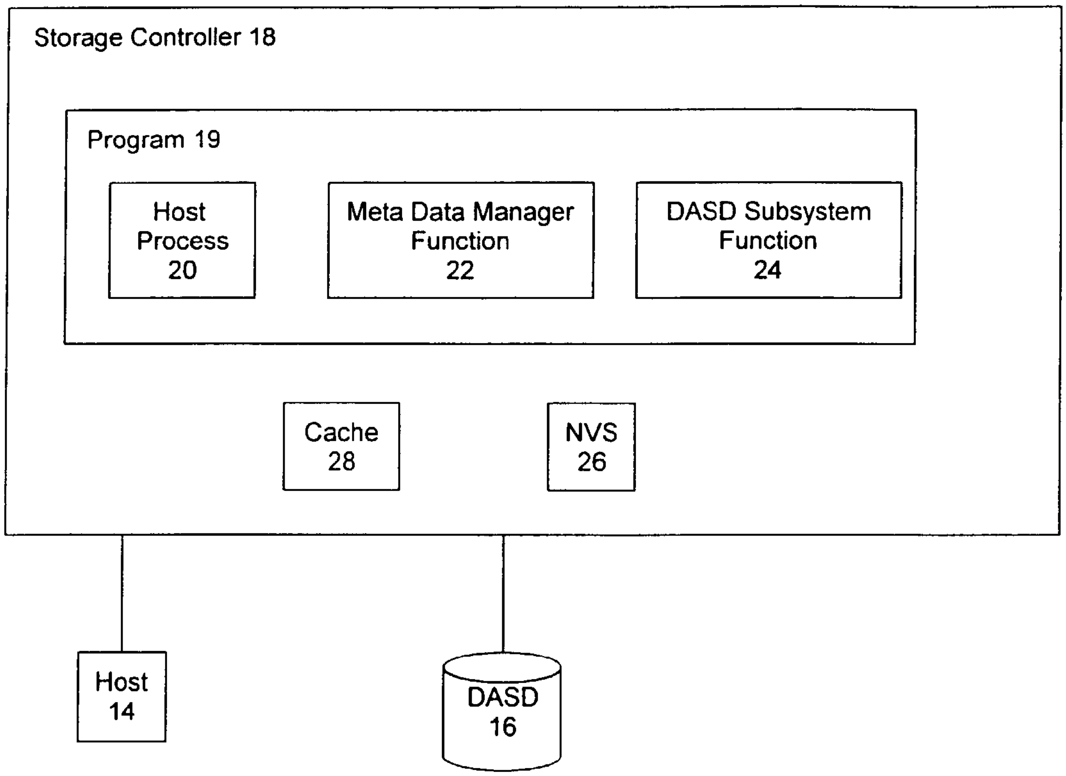
FIG. 1 is a block diagram of a hardware and software environment in which preferred embodiments of the present invention are implemented.

FIG. 1 illustrates a hardware and software environment in which preferred embodiments are implemented. At least one host 14 is in data communication with a DASD 16 via a storage controller 18. The host 14 may be any host system known in the art, such as a mainframe computer, workstations, etc., including an operating system such as WINDOWS®, AIX®, UNIX,® MVS™, etc. AIX is a registered trademark of International Business Machines Corporation ("IBM"); MVS is a trademark of IBM; WINDOWS is a registered trademark of Microsoft Corporation; and UNIX is a registered trademark licensed by the X/Open Company LTD. The storage controller 18, host system(s) 14, and DASD 16 may communicate via any network or communication system known in the art, such as LAN, TCP/IP, ESCON®, SAN, SNA, Fibre Channel, SCSI, etc. ESCON is a registered trademark of IBM. The DASDs 16 may be comprised of hard disk drives, tape cartridge libraries, optical disks, or any suitable large, non-volatile storage medium known in the art. The storage controller 18 may be any storage controller 18 known in the art, including the IBM 3990 Storage Controller. The IBM 3990 Storage Controller is described in IBM publication "Storage Subsystem Library: IBM 3990 Storage Control Reference (Models 1, 2, and 3)", IBM document no. GA32-0099-06, (IBM Copyright 1988, 1994), which publication is incorporated herein by reference in its entirety. Alternative storage controller embodiments are described in: "Failover System for a Multiprocessor Storage Controller," by Brent C. Beardsley, Matthew J. Kalos, Ronald R. Knowlden, Ser. No. 09/026,622, filed on Feb. 20, 1998; and "Failover and Failback System for a Direct Access Storage Device," by Brent C. Beardsley and Michael T. Benhase, Ser. No. 08/988,887, filed on Dec. 11, 1997, both of which applications are incorporated herein by reference in their entirety.

In preferred embodiments, with reference to FIG. 1, the storage controller 18 includes one or more processing units and a program 19 comprised of a host process 20, meta data manager function 22, and DASD subsystem function 24. Further included are a cache 28 and a non-volatile storage (NVS) 26. The NVS unit 26 may be a battery backed-up RAM. In preferred embodiments, the host process 20, meta data manager 22, and DASD subsystem 24 functions are separate programs or functional parts of one or more programs 19, and may be implemented as firmware in a ROM or software logic within an operating system and/or application program within the storage controller 18. The host process 20 is the component of the program 19 that manages communication with the host 14 and the DASD subsystem function 24 manages communication with the DASDs 16. The host process 20 executes in the storage controller 18 and manages the data request for customer data from the host 14. This host process 20 would generate a request for meta data when processing the host 14 access request for customer data. The meta data manager function 22 manages communication between the host process 20 and DASD subsystem function 24 components and performs many of the meta data management operations.

Figure 2:
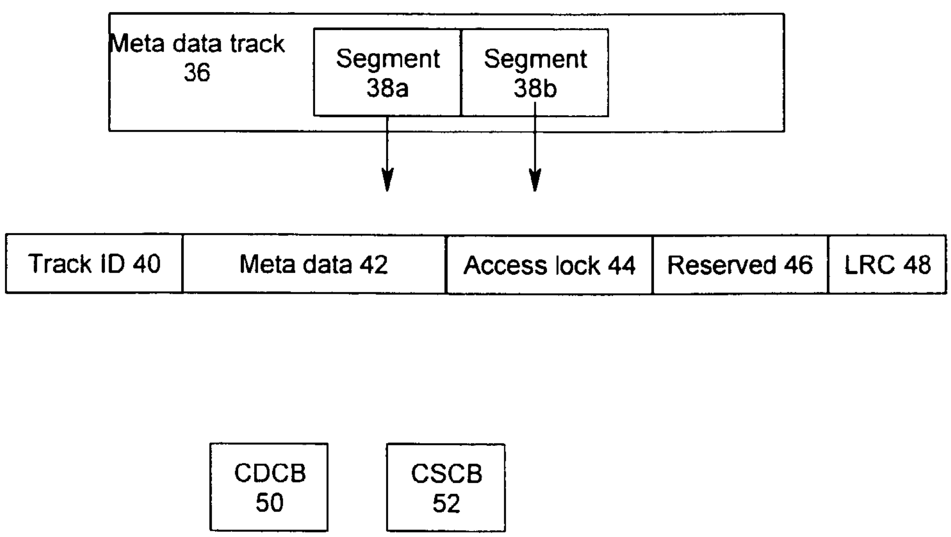
FIG. 2 is a diagram of a meta data track in accordance with preferred embodiments of the present invention.

The DASD 16 stores both customer data tracks, i.e., the actual data, and meta data tracks. In the embodiment of FIG. 2, each meta data track 36 is comprised of two segments 38*a, b*. Each segment 38*a, b* is comprised of five fields 40, 42, 44, 46, 48, which include: a track ID field 40 indicating the physical address (PA) of the meta data in the DASD 16; a meta data field 42 storing the actual meta data; an access lock field 44 storing access lock information; reserved bytes 46; and a longitudinal redundancy check (LRC) field 48 storing LRC information for parity and error checking functions. In alternative embodiments, the ordering of the fields 40, 42, 44, 46, 48 may be different and additional fields may be provided. The track ID 40 and LRC fields 48 are used for segment validation and the access lock field 44 is used to serialize access to the segments 38*a, b* when multiple hosts are granted access to the meta data track 36. The access lock 44 indicates whether a process has permission to update the meta data track 36.

In preferred embodiments, there are two separate data structures, the cache directory control block (CDCB) 50 and a cache segment control block (CSCB) 52, that the meta data manager function 22 utilizes in managing the meta data segments 38*a, b* while the meta data is in cache 28. The CDCB 50 includes bits indicating the address of sectors or segments 38*a, b* of staged meta data in cache and whether a track 36 in general has been modified. The CSCB 52 includes bits or flags indicating which sectors or segments 38*a, b* within a meta data track 36 have been modified. The CDCB 50 further includes a use counter for indicating how many hosts 14 have simultaneous, non-exclusive access to that meta data track 36 and a pointer to the CCB 50.

In preferred embodiments, a field in the CDCB 50 block indicates whether a process has exclusive access to the meta data track. Generally, an exclusive access is granted for a request to destage, stage or demote the track from cache. The meta data manager function 22 grants non-exclusive access to the meta data track 36 to a requesting host if another host does not have exclusive access to the meta data track. In preferred embodiments, the meta data track 36 may describe multiple customer data tracks. Thus, multiple processes directed toward different customer data tracks may concurrently be allowed non-exclusive access to the meta data track 36. In preferred embodiments, after each update or write, the LRC value in the LRC field 48 is updated to reflect the modifications.

The format of FIG. 2 is applicable to meta data tracks 36 stored both in DASD 16 and in cache 28.

In preferred embodiments, the NVS 26 stores an identifier, such as the address in the track ID 40 of a meta data track in cache 28 that was modified instead of storing a copy of the meta data. The storage controller 18 may use the NVS 26 during recovery operations to determine the meta data tracks that were modified. Storing only identifiers for the modified meta data in NVS 26 instead of the actual meta data increases storage capacity in the NVS 26 for backing-up non-meta data, such as modified customer data that has not yet been destaged to the DASD 16 and conserves processor cycles that would otherwise be consumed maintaining full copies of the meta data tracks in the NVS 26.

Read and Update Access Requests

The storage controller 18 processes meta data to determine parameters and aspects of the associated customer data to increase the efficiency of processing the customer data. For example, prior to staging in a large block of customer data for a host 14, the meta data manager function 22 may execute a read access request for meta data that contains a history of read accesses to this customer data. The historical information may reveal that only a small subset of the customer data is actually accessed. The storage controller 18 would process this historical information to determine whether to stage only that smaller, frequently accessed subset of data. In this way, the storage controller 18 access time and meta data utilization of cache resources is minimized because the storage controller 18 will not over stage more data than needed from the DASD 16 based on historical usage and staging of data. Meta data may also contain information about the format of the associated customer data that the storage controller 18 would otherwise have to access and stage from DASD 16 to consider. In particular, for a fast write access request, the storage controller 18 processes the meta data to determine the format of the customer data to update and then updates the customer data without staging the customer data track into cache. Because the meta data provides information on the format of the customer data, e.g., where the records start, there is no need to stage the actual customer data into cache to determine the format. Once customer data has been modified, the associated meta data may need to be updated accordingly.

Figure 3:
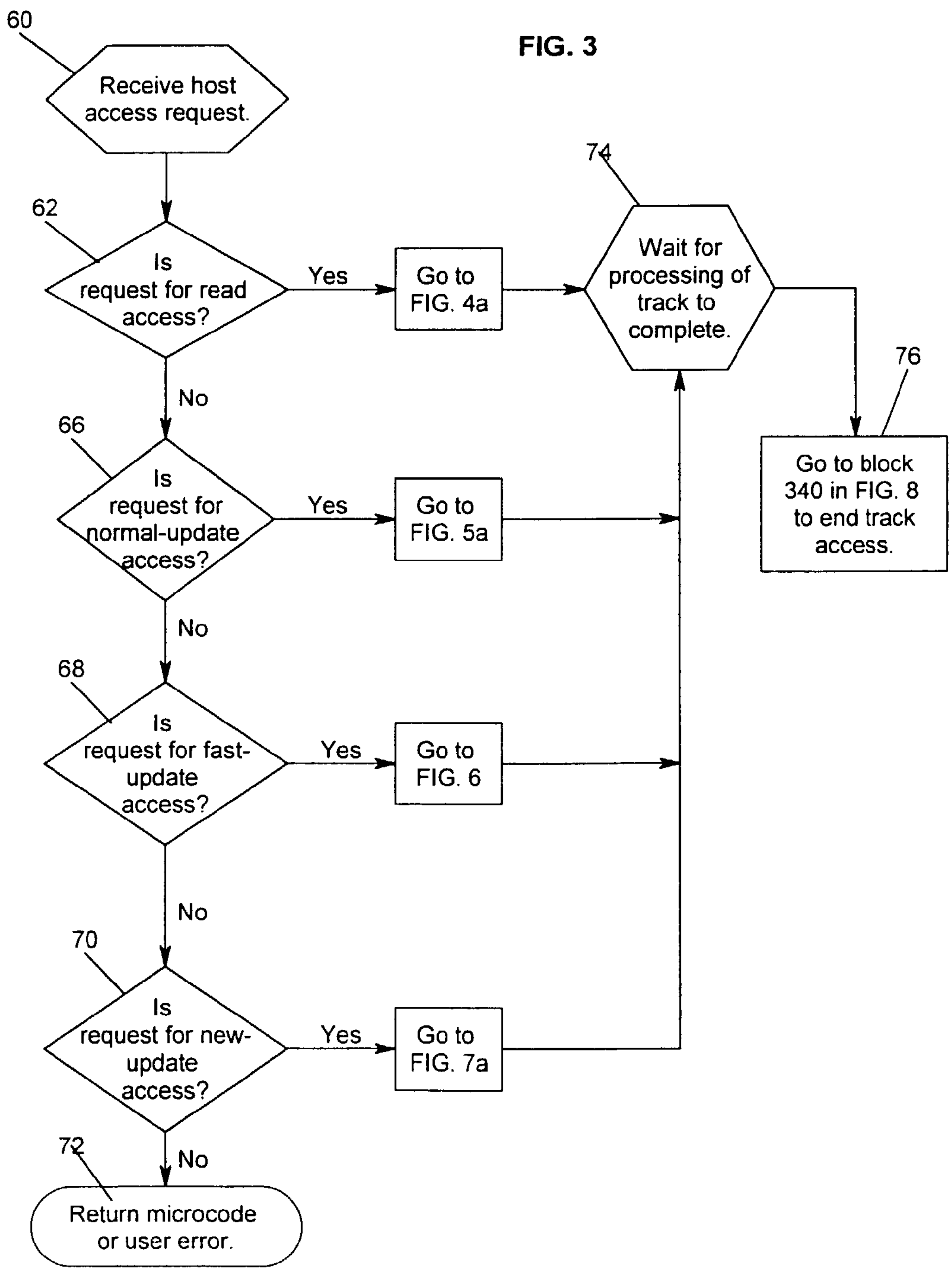
FIG. 3 illustrates logic to process a host access request in accordance with preferred embodiments of the present invention.

As discussed, the host process 20 transmits a request to access a meta data track 36 to the meta data manager function 22. Such a request may be in one of several access modes: read, normal-update, fast update, or new-update. FIG. 3 illustrates logic implemented in the meta data manager function 22 to determine the type of access request. In alternative embodiments, the ordering of the access request evaluation at blocks 62, 66, 68, and 70 may be in different orderings and certain evaluations may occur in parallel or in a different sequential order. With respect to FIG. 3, control begins at block 60, which represents the meta data manager function 22 receiving a meta data access request from the host process 20. At block 62, the meta data manager function 22 determines whether the host request is for a read access request. If so, control transfers to block 80 in FIG. 4*a*; otherwise, control transfers to block 66 where the meta data manager function 22 determines whether the request is for a normal update access request. If so, control transfers to block 180 in FIG. 5*a*; otherwise, control transfers to block 68 where the meta data manager function 22 determines whether the request is for a fast update access. If so, control transfers to block 240 in FIG. 6; otherwise, control transfers to block 70 where the meta data manager function 22 determines whether the request is for a new-update access. If so, control transfers to block 280 in FIG. 7*a*; otherwise the program returns a microcode error or user error. This error return would cause a warmstart recovery. If the logic reaches block 72, then the access request is not a recognized access request. After processing the request with the logic of FIGS. 4*a, b*, 5*a, b, c*, 6 or 7*a, b, c*, then control transfers to block 74 to wait for the processing of the meta data track to complete. Control then transfers to block 76, where the program proceeds to block 340 in FIG. 8 to end the track access. FIG. 9 illustrates logic implemented in the host process 20 to process the access request once access is granted to the requesting host. The access requests at blocks 62, 66, 68, and 70 for read access, normal-update access, fast-update access, and new-update access are non-exclusive access requests.

Figure 4A:
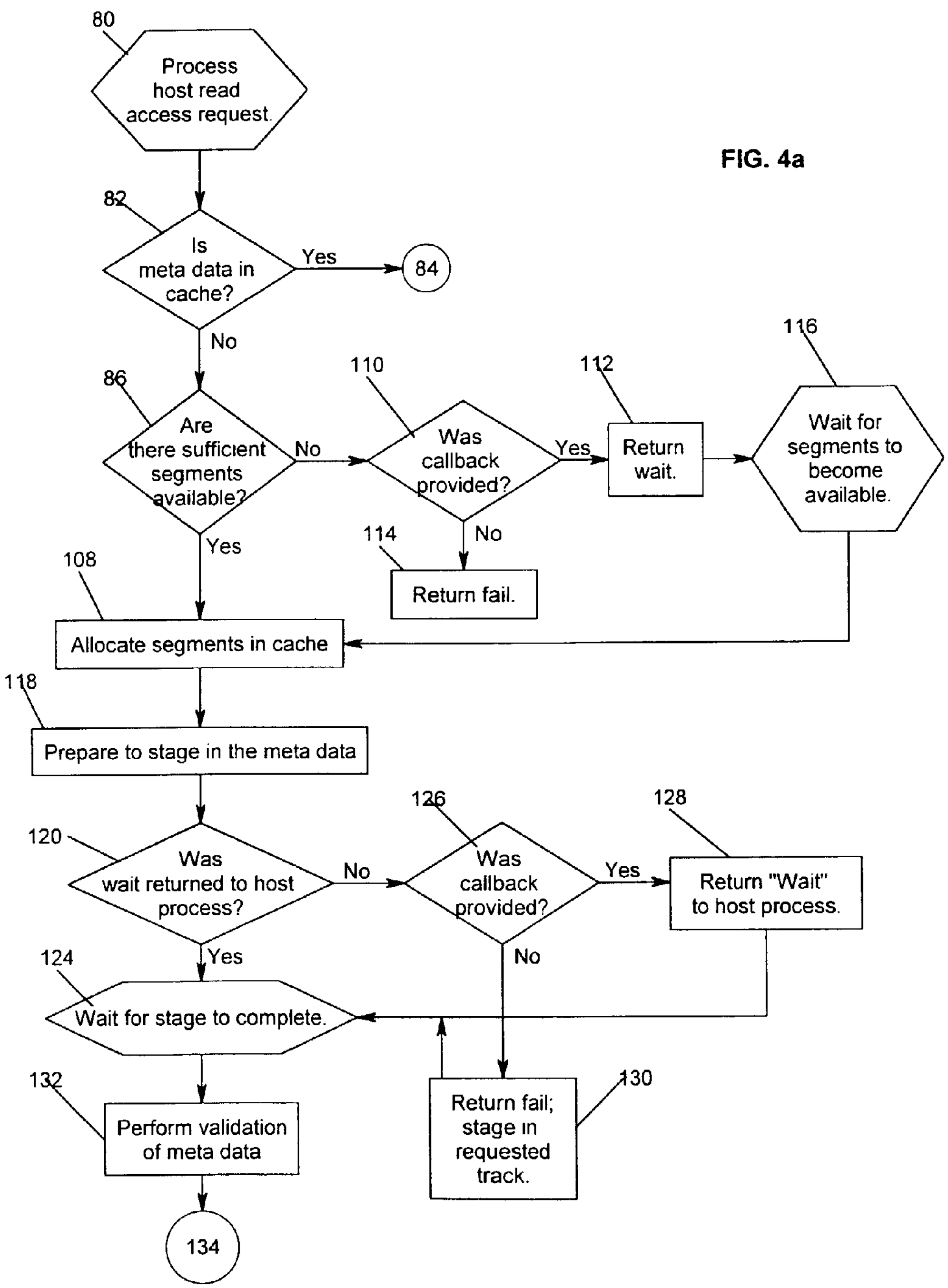
FIGS. 4*a, b* illustrate logic to process a host read access request in accordance with preferred embodiments of the present invention.
Figure 4B:
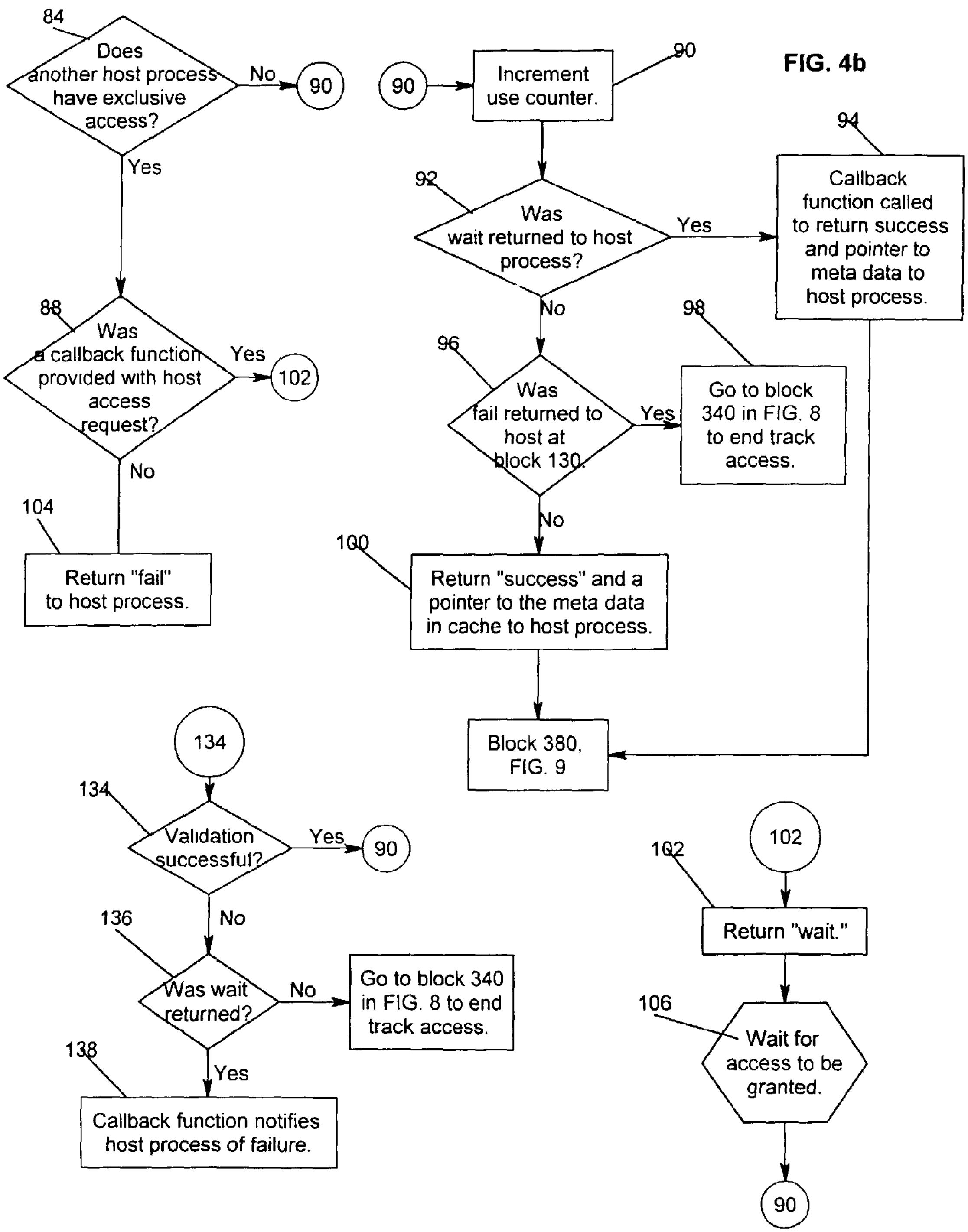

If the access request is for read access to the meta data, then control transfers to block 80 in FIG. 4*a* where the meta data manager function 22 processes the read access request. The host process 20 may generate a callback function to provide to the meta data manager function 22 to use when returning to the host process. The host process 20 uses the callback function to indicate that the host process 20 needs the meta data before proceeding and is willing to wait for the meta data to become available in cache 28 if the meta data is presently unavailable. Meta data may be unavailable if it is not in cache 28 or some other host process has exclusive access, e.g., is staging or destaging the meta data. If the host process 20 does not provide a callback function, then the host process 20 is not willing to wait for meta data to become available before proceeding. In such case, the meta data manager function 22 would only return success, if access is granted, or fail, if access is not granted, to the host process.

Control transfers to block 82 where the meta data manager function 22 determines whether the meta data track 36 is already in cache 28. If so, control transfers to block 84; otherwise control transfers to block 86. Block 84 represents the meta data manager function 22 determining whether another host process has exclusive access to the meta data track 36 in cache 28. If another host process has exclusive access, then control transfers to block 88; otherwise, control transfers to block 90.

If another host process does not have exclusive access, then at block 90, the meta data manger function 22 increments the use counter in the CDCB 50 data structure corresponding to the accessed meta data track 36. The use counter indicates how many hosts processes 20 have access to that meta data track 36. For every host process 22 that is granted access to the meta data track 36, the use count is incremented. Similarly, when a host process 20 terminates access to the meta data track 36, the use count is decremented. If the use count is zero, i.e., no host process 20 is accessing the meta data track 36, then the meta data track 36 may be destaged or demoted out of cache 28 to free cache segments. From block 90, control transfers to block 92 where the meta data manger function 22 determines whether wait was previously returned to the host process 20. If so, control transfers to block 94; otherwise control transfers to block 96. At block 94, the meta data manager function 22 calls the callback function to return success and a pointer to the meta data in cache 28 to the host process 20. From block 94, control transfers to block 380 in FIG. 9 where the host process 20 performs operations on the meta data.

At block 96, the meta data manager function 22 determines whether fail was returned to the host process at block 130. At block 130, the host process 20 does not wait and the meta data manager function 22 stages in the data to anticipate future accesses of the requested meta data. If fail was returned at block 130, then control transfers to block 98 to end track access at block 340 in FIG. 8. Otherwise, at block 96, if fail was not returned, control transfers to block 100 where the meta data manager function 22 returns to the host process 20 a success code and a pointer to the meta data in cache 28. From block 100, control transfers to block 380 in FIG. 9.

If, at block 84, another host process has exclusive access to the meta data that is the subject of the read access request, then control transfers to block 88 where the meta data manager function 22 determines whether the host process 20 provided a callback function. If so, control transfers to block 102 where the meta data manager function 22 returns a "wait" notification to the host process 20 and the read access request is suspended until the exclusive user releases access. When the requesting host process 20 receives the "wait" notification, the meta data manager function 22 waits at block 106 for notification that the exclusive access lock has been removed. Upon receiving notification that the host process having exclusive access surrendered the exclusive access lock, control transfers to block 90 to notify the requesting host process 20 that access to the requested meta data track 36 is granted. In this way, the meta data manager function 22 prevents a host process from accessing the meta data track 36 when another host process has exclusive access to the requested meta data track 36. If, at block 88, a callback functions was not provided, control transfers to block 104 to return "fail" to the host process 20.

If, at block 82, the meta data manger function 22 determines that the requested meta data track 36 is not in cache 28, then control transfers to block 86 where the meta data manager function 22 determines whether there are a sufficient number of allocatable segments, e.g., two, available in cache 28 to accommodate the meta data. If so, control transfers to block 108; otherwise, control transfers to blocks 110 where the meta data manager function 22 determines whether a callback function was provided. If a callback function was provided, then control transfers to block 112 to return a wait notification to the host process 20; otherwise fail is returned at block 114. If wait is returned, from block 112, then control transfers to block 116 where the host process waits for segments to become available. Once segments are available, from blocks 86 or 116, control transfers to block 108 where the meta data manager function 22 allocates segments in cache 28 to store the requested meta data track 36. Control transfers to block 118 where the meta data manager function 22 prepares to stage the meta data track 36 into the cache 28 from DASD 16. At this time, there would be exclusive access because of the staging of the meta data track 36 into cache 28.

Control then transfers to block 120 where the meta data manager function 22 determines whether wait was previously returned to the requesting host process 20. Both the meta data manager function 22 and host process 20 wait for the staging to complete. If wait was not returned, then control transfers to block 126 to determine where the meta data manager function 22 determines whether a callback function was provided. Otherwise, control transfers to block 124 to wait for the staging to complete. If, at block 126, a callback was provided, control transfers to block 128 to wait for the host process; otherwise, if a callback was not provided, control transfers to block 130 to return fail. After returning fail, the meta data manager function 22 may stage the requested meta data into cache 28 in anticipation of a subsequent request for the meta data. From block 120, 128 or 130, control transfers to block 124 to wait for the staging to complete.

After the meta data track 36 is staged into cache 28, control transfers to block 132 where the meta data manager function 22 performs a validation sequence on the meta data track 36 staged into cache 28. Control transfers to block 134 where the meta data manager function 22 determines whether validation was successful. If so, then control transfers back to block 90 et seq. to increment the use counter; otherwise, control transfers to block 136 to determine whether wait was returned. If wait was returned, then control transfers to block 138 where the meta data management function 22 calls the callback function to notify the host process of the failure of the stage operation. Otherwise, control transfers to block 340 in FIG. 8 to end track access.

In preferred embodiments, the meta data manager function 22 performs the validation sequence by exclusive-ORing (XORing) the meta data in each segment 38*a, b* with the LRC value in the LRC field 48 to produce a new LRC value. The LRC value was previously set such that the XORing of the LRC with the meta data should produce a zero LRC value if the meta data is valid. If the resulting LRC value is nonzero, then the meta data track 36 is invalid. Next, as part of the preferred validation process, the meta data manager function 22 compares the requested track ID (the physical address of the meta data on DASD 16) with the track ID value in the track ID field 40 in the meta data segment 38*a, b* in cache 28. If they match, then the meta data in cache 28 is the requested meta data. Finally, the meta data manager function 22 checks the access lock field 44. The access lock field 44 is used to control access to the segment when a host is reading or writing to the track. When validating a meta data track 36 immediately after staging it into cache 28, no other host process should have had access to the meta data track 36, and the access lock field 44 should reflect no other users of the meta data track 36. If the access lock field 44 indicates other users, then the meta data track 36 is invalid.

In preferred embodiments, if the validation was unsuccessful, then the data can be restaged and validated one or more additional times. If validation is successful within the allocated number of retries, then control transfers to block 90 et seq.; otherwise a "fail" notification is returned to the host process 20 or the meta data is invalidated and success is returned. In the case of invalidating and returning success, the invalidated meta data is returned to the host process 20 to handle.

Figure 5A:
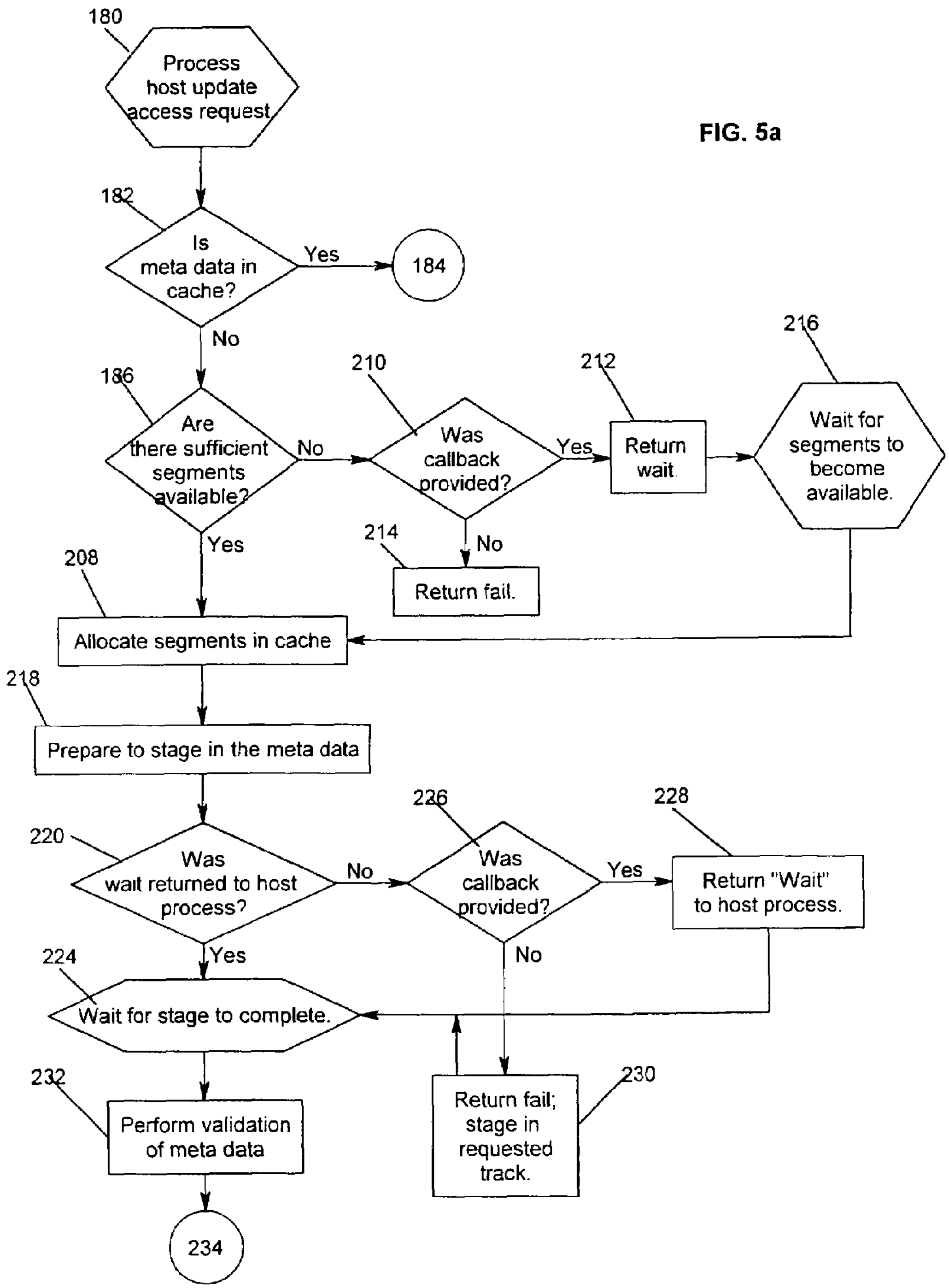
FIGS. 5*a, b, c* illustrate logic to process a normal-update access request in accordance with preferred embodiments of the present invention.
Figure 5B:
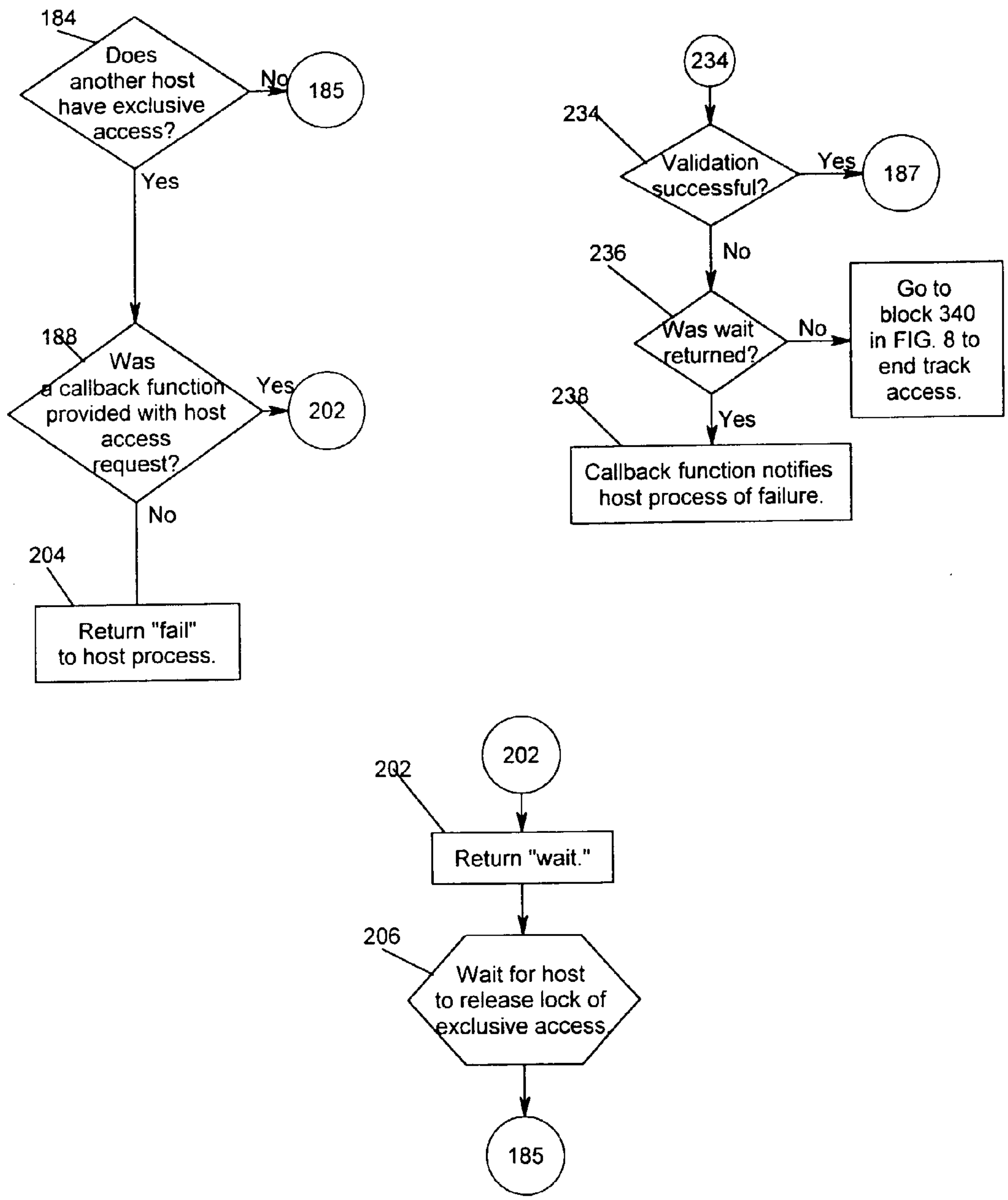
Figure 5C:
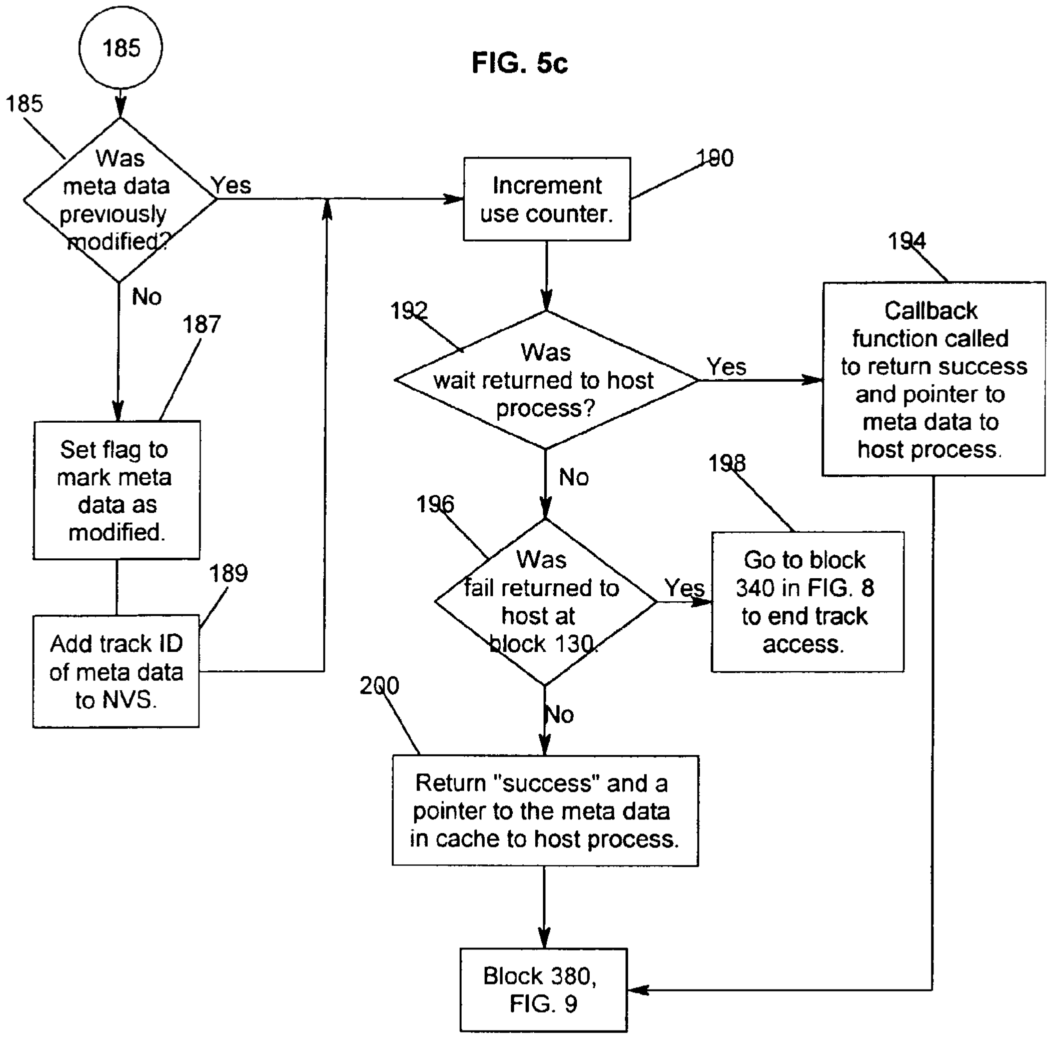

FIGS. 5*a, b, c* illustrate the logic to process a host access request that is a normal-update access to update data. A host process 20 requests update access for the purpose of updating the meta data track to reflect changes in the associated customer data. For this reason, an indication of the modification of the meta data track is made in the NVS 26. The logic of FIGS. 5*a, b, c* includes the same steps as in FIGS. 4*a, b* except for the steps that occur after the meta data is found to be in cache 28 and another host process 20 does not have exclusive access and for the steps that occur after validation is determined successful. With respect to FIGS. 5*a, b, c*, from block 184, when another host process 20 does not have exclusive access, control transfers to block 185 where the meta data manager function 22 determines whether the meta data track 36 in cache 28 was previously modified. If so, control transfers to block 190 et seq., which are the same as steps 90 et seq. If the data was not previously modified, control transfers to block 187 where the meta data manager function 22 sets a flag in the CDCB 50 to mark the meta data track 36 as modified and sets a flag in the CSCB 52 to mark specific sectors within the meta data track 36 as modified. The CDCB 50 maintains a bit map of the sectors. When a specific sector is modified, then the corresponding bit map location for that sector in the CSCB 52 is set "on" to indicate the modification. Thus, in preferred embodiments, the CDCB 50 maintains a bit map of the sectors and the CSCB 52 maintains a bit map of only those sectors that have been modified. Control then transfers to block 189 where the meta data manager function 22 stores the physical address of the meta data track in DASD 16 (the value in the track ID field 40) in the NVS 26. Once the track ID is stored in NVS 26, control transfers to block 190. Thus, if failure occurs, the storage controller 18 can determine the meta data tracks 36 that were modified by examining a list of meta data track IDs in the NVS 26. All meta data track IDs on the list indicate those meta data tracks that have been modified.

The logic of FIGS. 5*a, b, c* also differs from that of FIGS. 4*a, b* with respect to the steps that occur if validation is successful. If validation is successful at block 234, then control proceeds directly to block 187 to set the flag to indicate that the meta data track 36 has been modified. Because from block 208 et seq. the meta data track 36 is brought into cache 28 for the first time, the meta data track 36 would not have been marked as previously modified.

Figure 6:
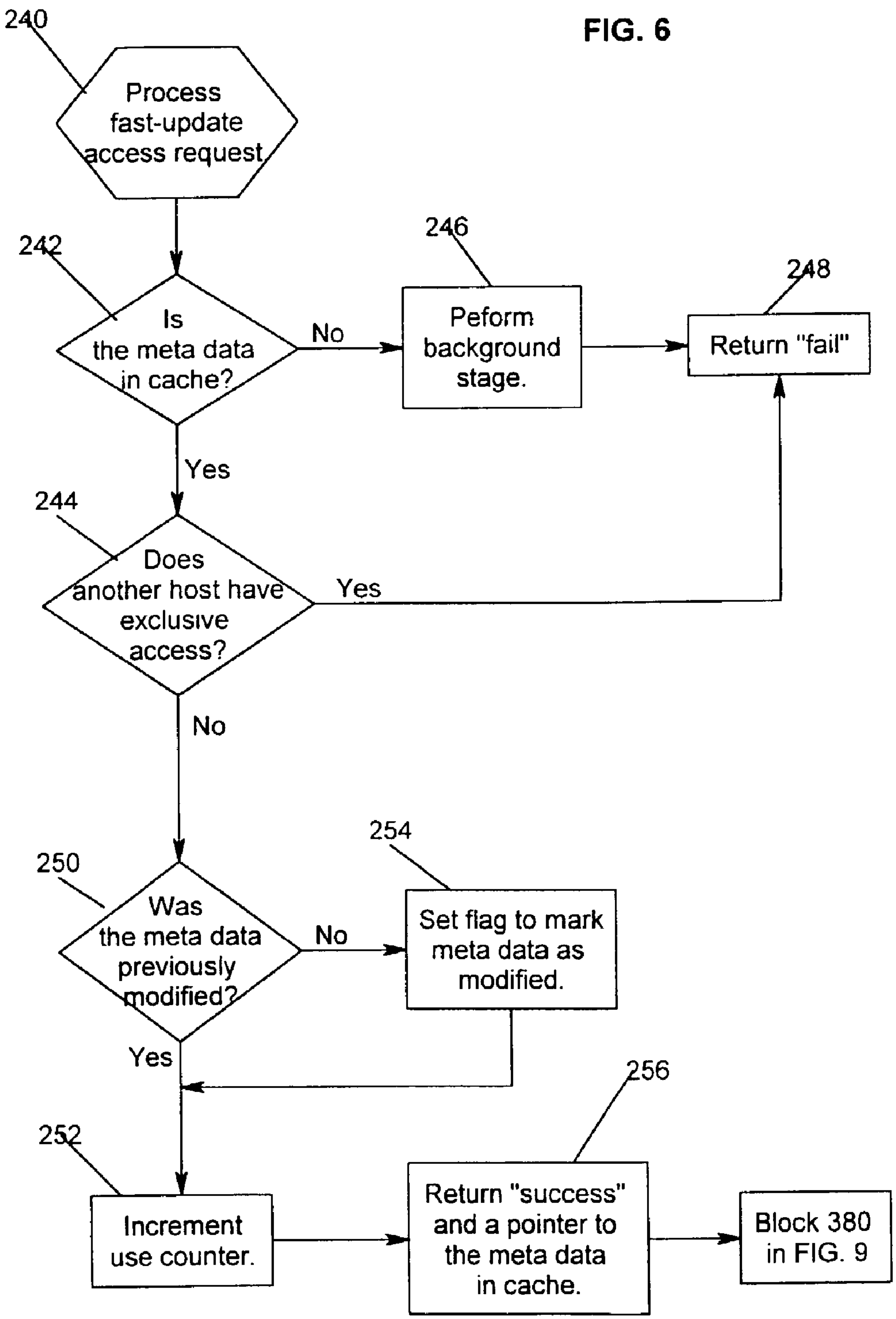
FIG. 6 illustrates logic to process a fast-update access request in accordance with preferred embodiments of the present invention.

FIG. 6 illustrates logic for processing a fast-update access request. In preferred embodiments, fast-update access is used for a type of meta data known as adaptive caching control block (ACCB) meta data, which holds a history of read accesses to tracks in a cylinder band. The storage controller 18 processes ACCB meta data to determine how to efficiently stage a customer data track, i.e.,—whether the whole track, the requested data or the requested data to the end of the track should be staged based on past usage of the customer data tracks represented by the meta data track 36. Fast update data is a data that is less important than other types. For this reason, the meta data manager function 22 will not wait for the staging of the meta data track 36 into cache 28 to complete if it is not already in cache 28. However, the requested meta data track 36 may still be staged into cache 28 in anticipation of subsequent requests to the track 36. In addition, if the meta data for a fast-update access track is in cache 28, then the track ID will not be stored in NVS 26. If the meta data track 26 is not in cache, the meta data manager function 22 will execute a background stage operation to stage the meta data track 36 into cache to anticipate any subsequent request to the meta data track 36. The storage controller 18, i.e., the storage controller 18 thread or host process 20 servicing the host request, will not wait for the completion of this background staging operation.

With reference to FIG. 6, control begins at block 240 where the host process 20 processes a fast update request. Control transfers to block 242 where the meta data manager function 22 determines whether the meta data track 36 is in cache 28. If the meta data track 36 is in cache, then control transfers to block 244; otherwise, control transfers to block 246 where the host process 20 initiates a background stage operation to stage the meta data into cache 28. From block 246, control transfers to block 248 to return a "fail" notification to the host process 20. Before or after returning "fail," the meta data manager function 22 may start staging the requested meta data track 26 into cache 28 in anticipation of subsequent access requests toward the requested meta data track 36 if the resources are available in anticipation of other requests. If the meta data track 36 is found in cache 28, then control transfers to block 244 where the meta data manager function 22 determines whether another host process 20 has exclusive access to the meta data track 36 in cache 28. If so, control transfers back to block 248 to return fail; otherwise, control transfers to block 250 where the meta data manager function 22 determines whether the meta data track 36 in cache 28 was previously modified. If so, control transfers to block 252 where the meta data manager function 22 increments the use counter in the CSCB 52 and then to block 256 to return to the storage controller 18 a "success" notification and a pointer to the meta data in cache 28. If the meta data was not previously modified, then control transfers to block 254, where the meta data manager function 22 sets flags in the CDCB 50 to mark the meta data track 36 as modified and flags in the CSCB 52 bitmap to mark specific sectors within the meta data track 36 as modified From block 254, control transfers to block 252. From block 256, control transfers to block 380 in FIG. 9 where the host process 20 performs the operations on the meta data.

Figure 7A:
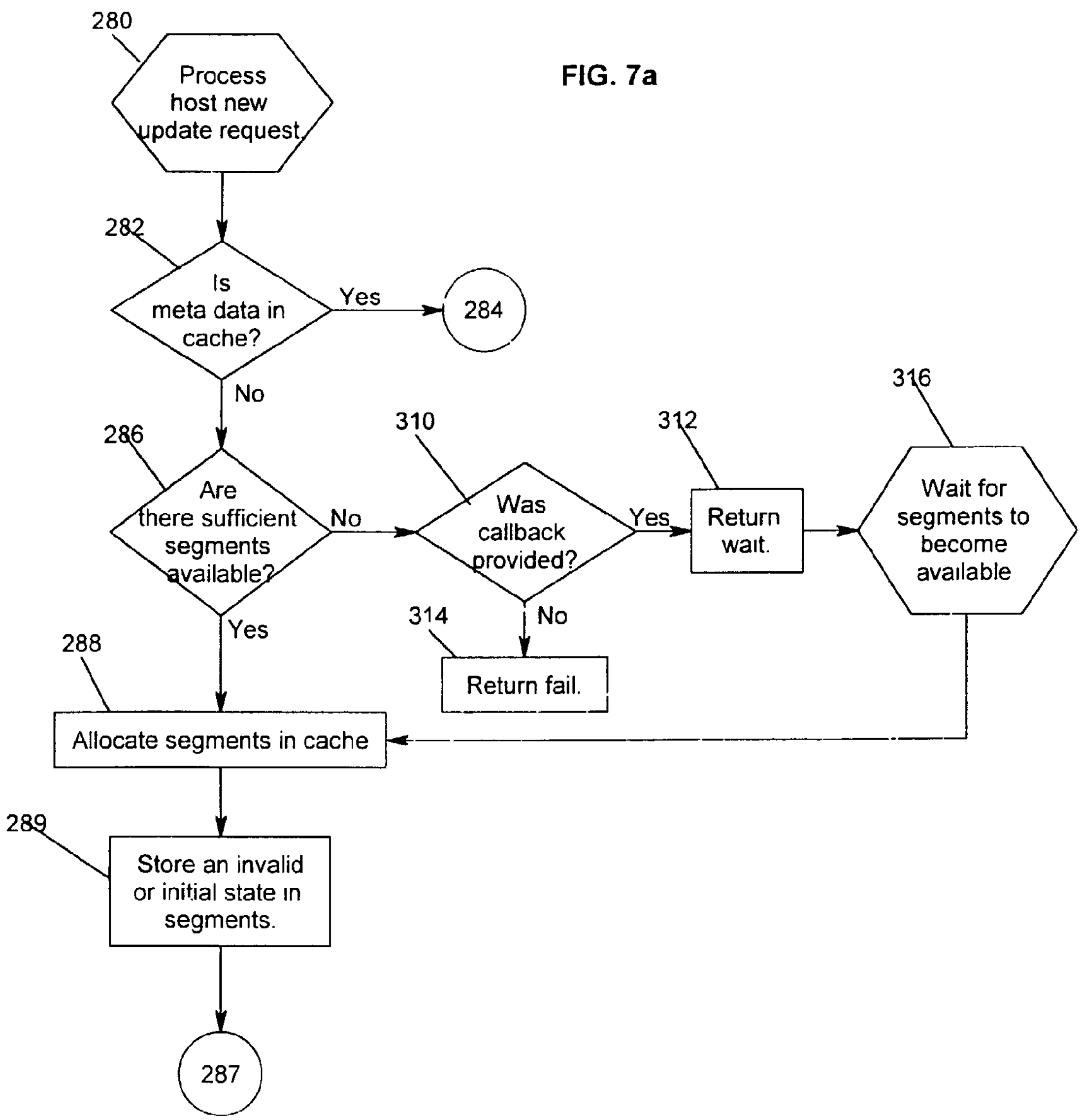
FIGS. 7*a, b, c* illustrate logic to process a new-update access request in accordance with preferred embodiments of the present invention.
Figure 7B:
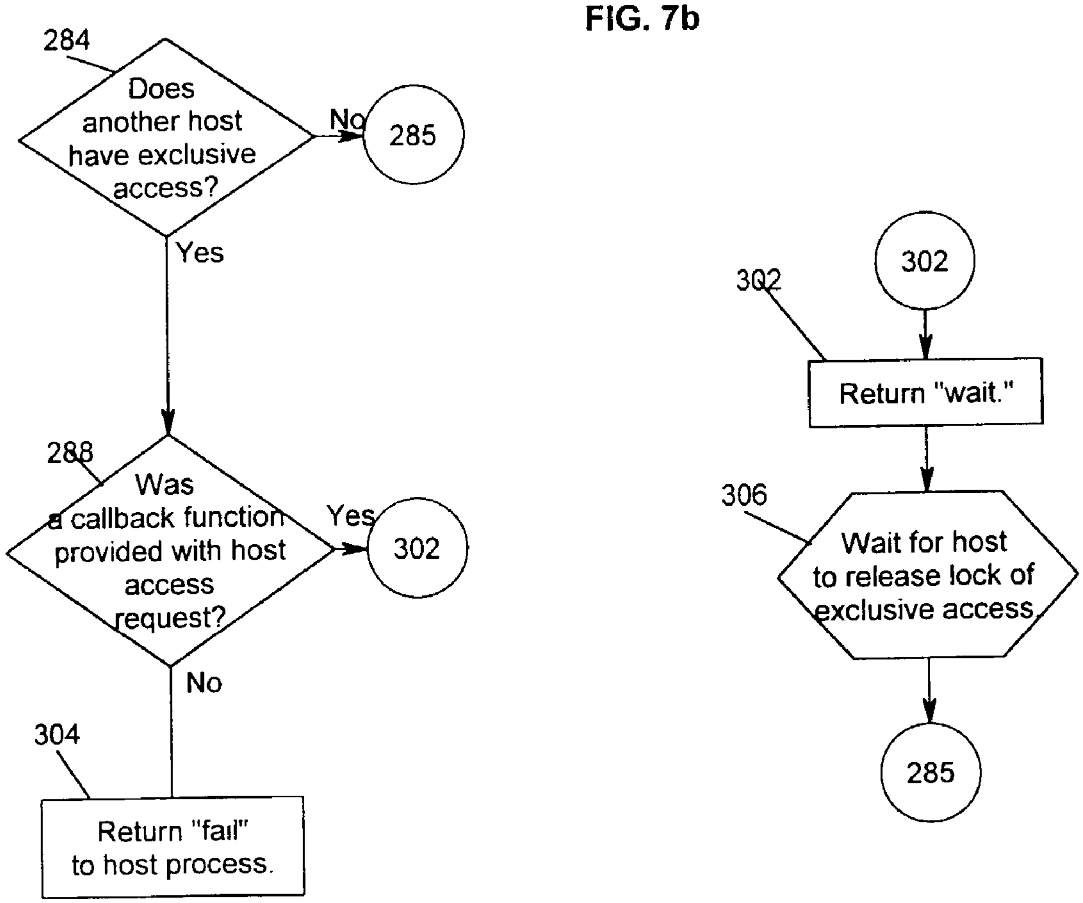
Figure 7C:
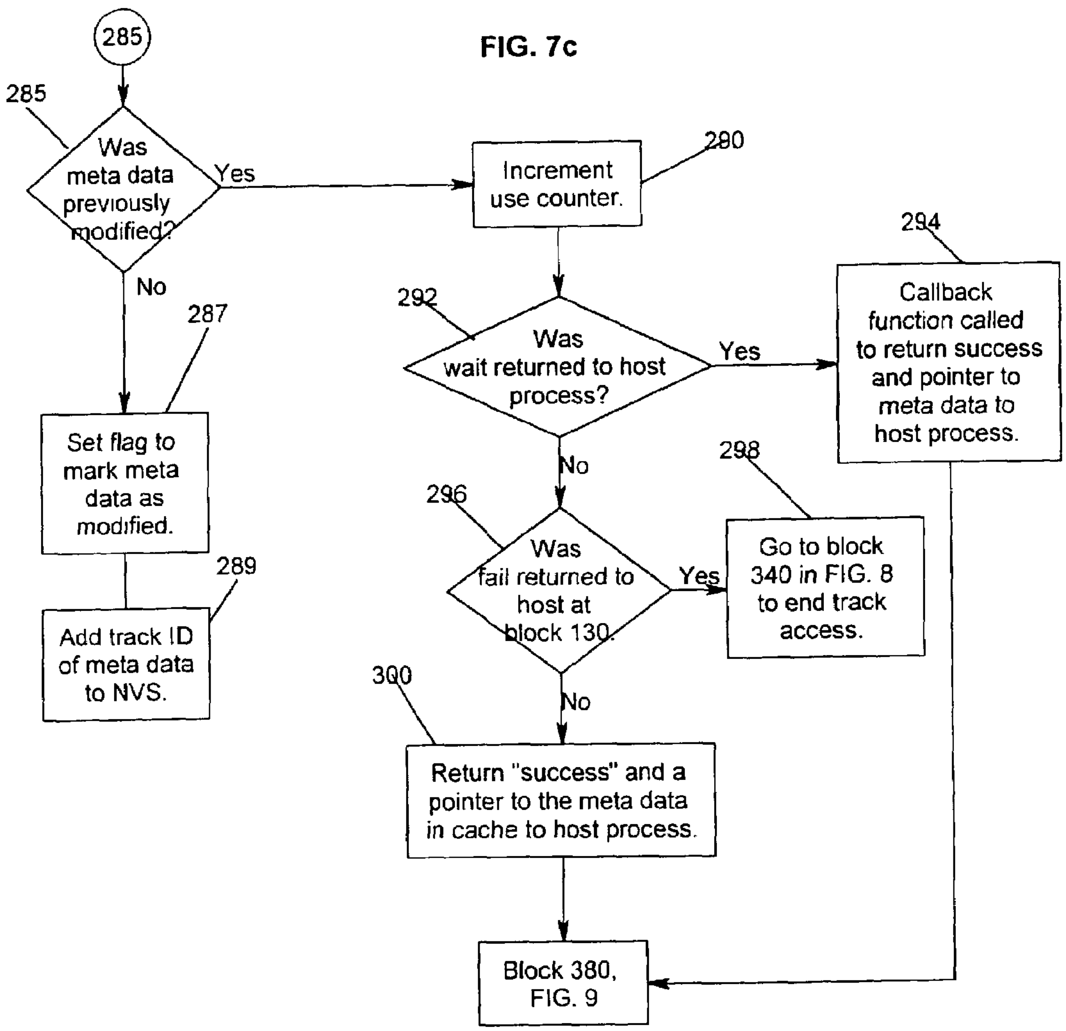

FIGS. 7*a, b, c* illustrate logic to process a new update access. In preferred embodiments, a host process 20 issues a new-update access request for meta data used during error recovery, such as copy services (CS) meta data, which holds bit maps of customer data tracks in cache 28 that have been modified but not yet destaged to DASD 16. With a new-update access request, if the requested meta data track 36 is not in cache 28, then the meta data function manager 22 will not stage the meta data from DASD 16 because the meta data track 36 in DASD 16 may not accurately reflect the customer tracks. Instead, two segments are allocated and an invalid state is stored, indicating that the entire customer data track associated with the meta data will have to be staged in from DASD 16 to rebuild the meta data.

The logic of FIGS. 7*a, b, c* is identical to the steps in FIGS. 5*a, b, c*, except with respect to what happens after sufficient segments become available in cache 28 at blocks

208 et seq. to stage the meta data. After sufficient segments of cache become available, at blocks 286 or 316 in FIG. 7*a*, control transfers to block 288 where the meta data function 22 allocates pageable segments in cache 28 to the meta data track 36. Control transfers to block 289 where the meta data manager function 22 stores an invalid or initial state in those segments. Meta data for certain data types that are comprised of values, such as statistics on the customer data, will be initialized to zero and, thus, the initial state may be stored. Other meta data types, such as track summaries, will be flagged as invalid. From block 289, control transfers to block 287 to mark the data as modified. Modified meta data marked as invalid or at its initial state is flagged to be recovered or rebuilt.

Figure 8:
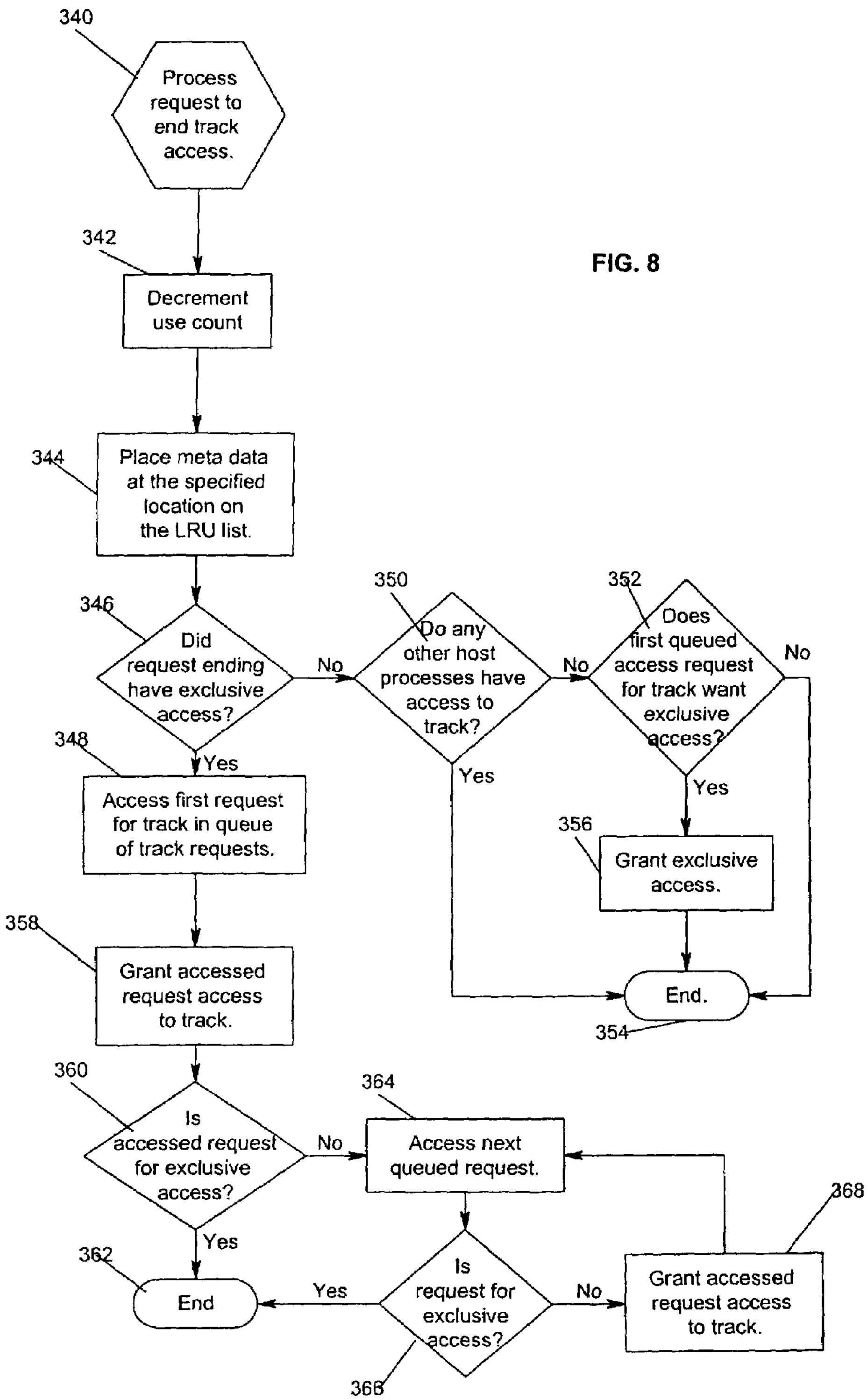
FIG. 8 illustrates logic to process an end track access request in accordance with preferred embodiments of the present invention.
Figure 9:
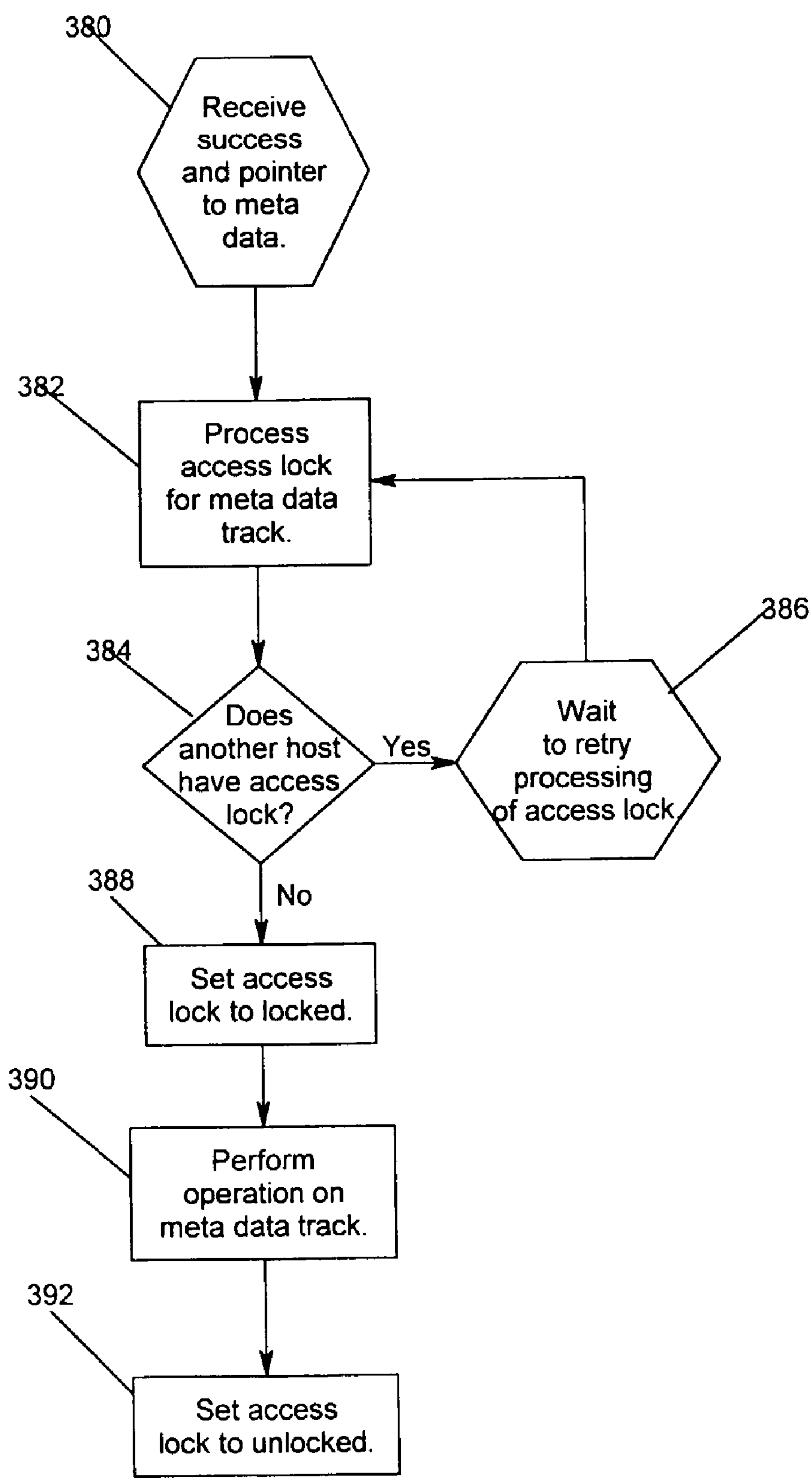
FIG. 9 illustrates logic implemented in a host to process a particular read or write operation in accordance with preferred embodiments of the present invention.

FIG. 8 illustrates logic that is executed when a host process has given up access to a particular meta data track 36. Upon a host process 20 relinquishing the exclusive access to a meta data track 36, the meta data manager function 22 then proceeds to provide access to other host processes queued to access the meta data track, i.e., previously provided a "wait" notification message. When the "wait" notification was provided, the host process meta data requests were queued in a wait queue to wait for the host process 20 having exclusive access to release such exclusive access. Control begins at block 340 where the meta data function 22 processes a request to end access of a meta data track 36. Control transfers to block 342 to decrement the use counter. Control then transfers to block 344 where the CDCB 50 for the meta data track 36 is placed on the LRU list, and the end track access request terminates. The LRU list is used to determine when meta data tracks are destaged or demoted out of cache 28; those closer to the least recently used end get destaged and demoted first. Meta data tracks are demoted from cache 28 to make room for new cache 28 entries.

Control then transfers to block 346 where the meta data manager function 22 determines whether the host process 20 releasing access had exclusive access. If so, control transfers to block 348; otherwise, control transfers to block 350 where the data manager function 22 determines whether any host process other than the host process ending access have access to the track. If not, control transfers to block 352 where the meta data manager function 22 determines whether the first queued request wants exclusive access. If there are other host processes that have access to the track, then control transfers from block 350 to block 354 to end the program. If the first queued request wants exclusive access, control transfers to block 356 to grant exclusive access; otherwise control transfers to block 354 to end.

If, at block 346, the host process releasing access had exclusive access, then at block 348, the meta data manager function 22 accesses the first access request in the wait queue. Control then transfers to block 358 where the meta data manager function 22 grants access to the queued request. (At this point, the access grant could be exclusive.) Control transfers to block 360 where the meta data manager function 22 determines whether the request provided access at block 346 is an exclusive access request. If so, control transfers to block 362 to end the logic and indication is made that the host process provided access at block 358 has exclusive access of the meta data track 22. Otherwise, if the queued request just provided access is non-exclusive, control transfers to block 364 to access the next queued request and then to block 366 to determine whether the next request is exclusive. If the next request is non-exclusive, then control transfers to block 368 to grant the accessed request access to the track and then back to block 364 to access the next request. If the next request is for exclusive access, then control transfers from block 362 to end the logic. In this way, the meta data manager function 22 provides access to non-exclusive queued access requests in the wait queue until an exclusive access request is provided access. As discussed, exclusive access is typically only provided when staging, destaging or demoting data from cache. The process of providing queued requests access is terminated after all the queued requests are processed.

FIG. 9 illustrates logic implemented by a host process provided success notification and a pointer to the meta data track 36 in FIGS. 4, 5, 6 or 7. The logic of FIG. 9 utilizes the information in the access lock field 44 in the meta data segments 38*a, b* to sequence the operations, i.e., writing or reading, performed on a meta data track by the hosts concurrently granted access to a track. Thus, the logic of FIG. 9 insures that no two host processes provided non-exclusive access to a particular meta data track 36 access the track at the same time. Control begins at block 380 which represents a host process receiving success notification and a pointer to the meta data track 36 in cache. Control transfers to block 382 where the host process 20 processes the access lock 44 in the meta data track 36. At block 384, the host process 20 determines whether another host process is currently accessing the meta data track 36. If so, control transfers to block 386 to retry reading the access lock 44. After the host 14 determines that another host is not accessing the meta data track 36, control transfers from block 384 to block 388 to set the access lock 44 to locked. For instance, if the access lock 44 is set to "on," i.e., binary one, a host is accessing the meta data track 36 whereas "off," i.e., binary zero, indicates no host is currently accessing the meta data track. Control then transfers to block 390 where the host just obtaining access performs the access operation on the meta data track 36, i.e., read access, normal update access, fast-update access or new update access. Upon completing the access operation, control transfers to block 392 where the accessing host process 20 sets the access lock 44 to unlocked to allow another host to perform an operation on the meta data track 36.

Warmstart and Coldstart Recovery

After a power loss or other system failure, the modified meta data tracks 36 in cache 28 may be lost. There are at least two types of recovery operations, warmstart recovery and coldstart recovery. A warmstart recovery is often initiated to recover from microcode errors. Microcode errors are detected by the microcode itself, and may result from a list pointer or an array index that addresses an out-of-bounds address, or other unusual states. In preferred embodiments, the microcode, upon detecting a microcode error, may call a specific function that causes lower level operating services to go through a warmstart recovery sequence. Such a warmstart recovery sequence may halt all work-in-progress and cause executing functions to verify associated control structures and data. A coldstart recovery may be initiated to recover from a loss of power. A coldstart recovery typically involves "rebooting" the system. With a warmstart recovery, there may be meta data tracks 36 remaining in cache 28. However, with a coldstart recovery, cache is initialized and no data, including meta data tracks 36, prior to initialization remain in cache.

Figure 10:
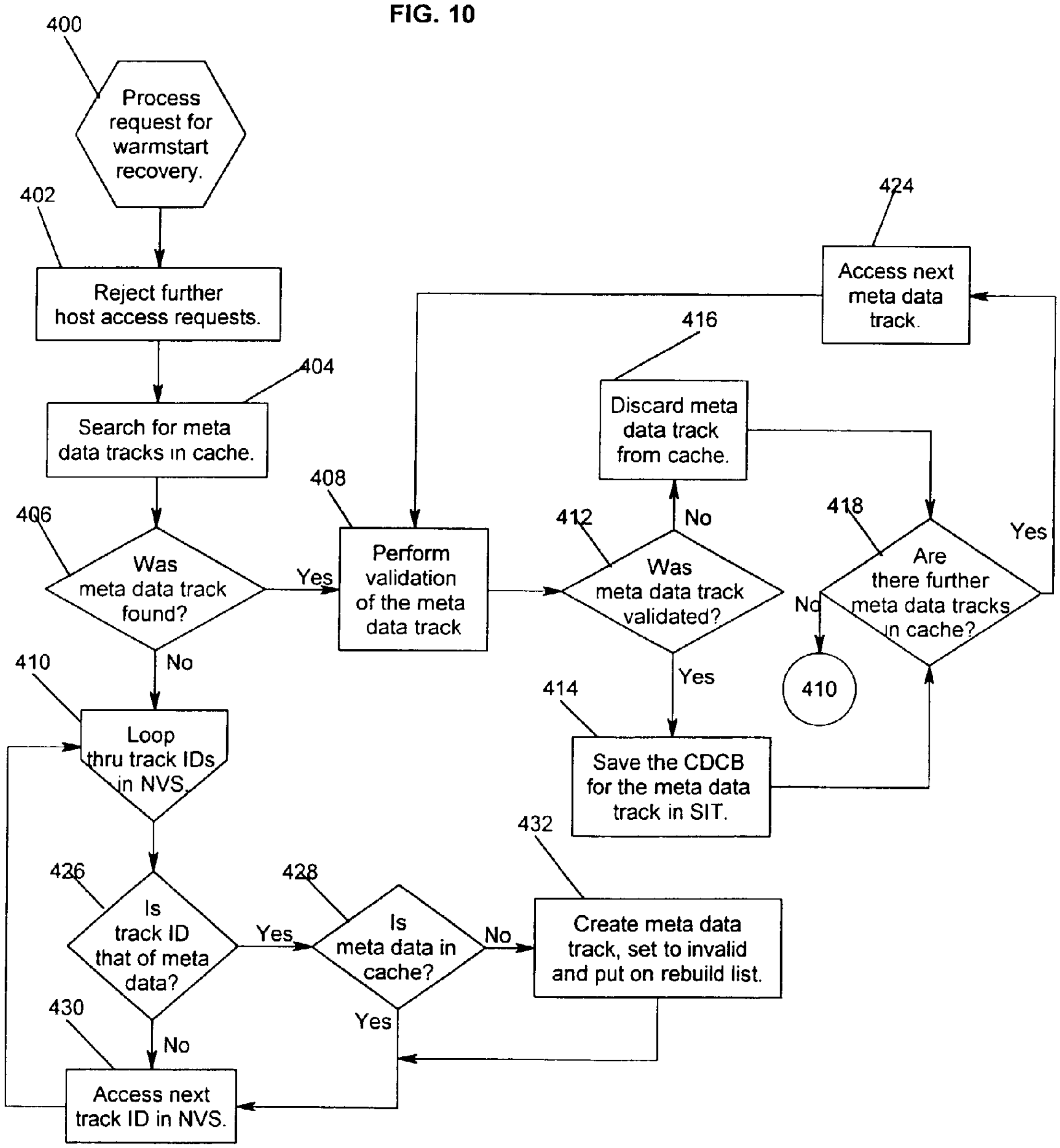
FIG. 10 illustrates logic for a warmstart recovery sequence in accordance with preferred embodiments of the present invention.

In the event of a microcode error or other warmstart recovery triggering event, the meta data manager function 22 invokes a warmstart recovery process illustrated in FIG. 10. The logic of FIG. 10 may be implemented as firmware stored in read-only memory (ROM) of the storage controller 18 or as software logic in the storage controller 18. During warmstart recovery, only invalid meta data is rebuilt because microcode errors may not have caused the loss of all meta data tracks 36 in cache 28. With respect to FIG. 10, control begins at block 400 where the meta data manager function 22 processes a request for a warmstart recovery. Control transfers to block 402 which represents the meta data manager function 22 rejecting further requests from host processes 20 until the validation process is completed. Next, control transfers to block 404 where the meta data manager function 22 scans the cache 28 for meta data tracks 36. In preferred embodiments, to locate meta data tracks 36, the meta data manager function 22 examines the track ID of every CDCB 50 that exists, both those that are allocated to segments in cache 28 and that are available for allocation.

Control transfers to block 406 where the meta data manager function 22 determines whether a meta data track 36 was found. If so, control transfers to block 408; otherwise, control transfers to block 410. Block 408 represents the meta data manager function 22 executing a validation routine on the meta data track 36. As discussed, the meta data manager function 22 performs the validation sequence by exclusive-ORing (XORing) the meta data in each segment 38 with the LRC value in the LRC field 48 to produce a new LRC value. The LRC value was previously set such that the XORing of the LRC with the meta data should produce a zero LRC value if the meta data is valid. If the resulting LRC value is nonzero, the meta data track 36 is invalid. From block 408, control transfers to block 412 where the meta data manager function 22 determines whether the meta data track 36 is valid. If so, control transfers to block 414 where the meta data manager function 22 stores the track ID, i.e., address of the meta data track 36, in a scatter index table (SIT), or hash table in the cache 28 or other accessible memory area. In cache 28, the SIT table would be managed by the directory manager of the cache 28. Otherwise, the meta data track 36 is invalid, and control transfers to block 416 where the meta data track 36 is discarded. In such invalid state, the meta data track is not indicated in the SIT and its CDCB 50, CSCB 52and other associated data structures are freed. From blocks 414 or 416, control transfers to block 418 where the meta data manager function 22 determines whether there are further meta data tracks to access in cache 28. If so, control transfers back to block 424 to access the next meta data track; otherwise, control transfers to block 410 to create a rebuild list that is subsequently used to rebuild meta data tracks 36 in cache. From block 424, control transfers back to block 408 to validate the next meta data track 36 in cache 28. If there are no further meta data tracks 36 in cache 28 to validate, control transfers to block 410 to begin to process the list of track IDs stored in NVS indicating those meta data tracks 36 that are modified and not destaged before the warmstart recovery initiated at block 400. A meta data track ID in the list indicates a meta data track 36 that has been modified and not saved into DASD 16.

When the loop at block 410 is initiated, the meta data manager function 22 accesses the first track ID in the NVS 26. Control transfers to block 426 where the meta data manager function 22 determines whether the track ID is for meta data. In further embodiments, the NVS may also maintain the track ID of modified customer, as described in the commonly assigned patent application entitled "A Method and System for Caching Data In a Storage System," to Brent C. Beardsley, Michael T. Benhase, Douglas A. Martin, Robert L. Morton, and Kenneth W. Todd, having attorney docket no. TU999002, and which application is incorporated herein by reference in its entirety. If the track ID is for meta data, then control transfers to block 428; otherwise, control transfers to block 430 to access the next track in NVS 26 and to the continue the loop 410 to process the next track in NVS 26. At block 428, the meta data manager function 22 determines whether the meta data track 36 identified by the track ID in NVS 26 is in cache 28 by checking if the CDCB 50 for the track is in the SIT. If so, there is no need to rebuild the meta data track 36 and control transfers to block 430 to access and process the next track ID in NVS 26. If the meta data track 36 is not in cache 28, then control transfers to block 432 to create the meta data track 36 in cache 28 by placing the CDCB 50 for the track in the SIT, to set the value of the meta data track 36 to invalid, and to place the meta data track 36 on a rebuild list to rebuild in cache 28. From block 432, control transfers to block 430 to process the next track ID in NVS 26.

Figure 11:
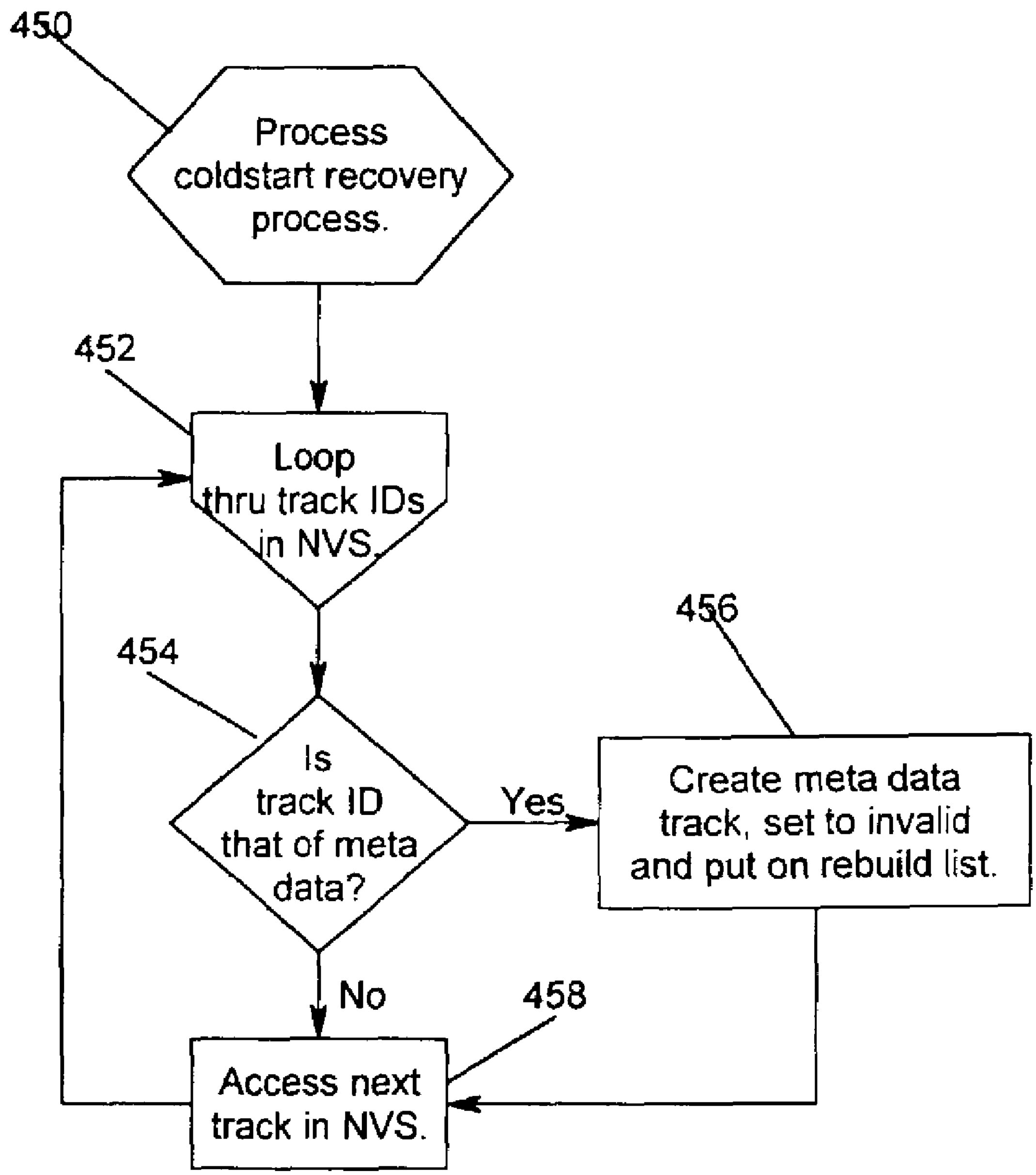
FIG. 11 illustrates logic for a coldstart recovery sequence in accordance with preferred embodiments of the present invention.

In the event of a power failure, the meta data manager function 22 may invoke a coldstart recovery process illustrated in FIG. 11. During coldstart recovery all modified meta data tracks 36 must be rebuilt in cache 28 because power failures are assumed to have caused the loss of all data in cache 28. Control begins at block 450 where the meta data manager function 22 processes a request for a coldstart recovery. Control transfers to block 452 where a loop begins to process the track IDs stored in NVS, including all the meta data tracks 36 modified and not destaged before the coldstart recovery initiated at block 450. When the loop is initiated, the meta data manager function 22 accesses the first track ID in the NVS 26. Control transfers to block 454 where the meta data manager function 22 determines whether the accessed track ID is for a meta data track 36. If so, then control transfers to block 456 to create the meta data track 36 in cache 28 by placing the CDCB 50 in the SIT, to set the value of the meta data track 36 to invalid, and to place the meta data track 36 on a rebuild list to rebuild in cache 28. From block 456 or from the no branch of 454, control transfers to block 458 to access and process the next track ID in NVS 26.

The Meta Data Rebuilding Process

The output of either the warmstart or coldstart recovery process is a list of previously modified meta data tracks 36 that must be rebuilt in cache 28. One method of rebuilding invalid meta data tracks 36 is to wait until an access request is made for such tracks, and then rebuild the meta data track 36 at that time. However, if this method is used, the access request is delayed until the meta data track 36 is rebuilt. To avoid delays in returning meta data tracks 36 to a host process 20, in preferred embodiments, the meta data manager function 22 executes a background routine to rebuild the meta data tracks 36. Thus, when a host process 20 requests a meta data track, such requested meta data is likely available for immediate return to the host process 20.

Figure 12:
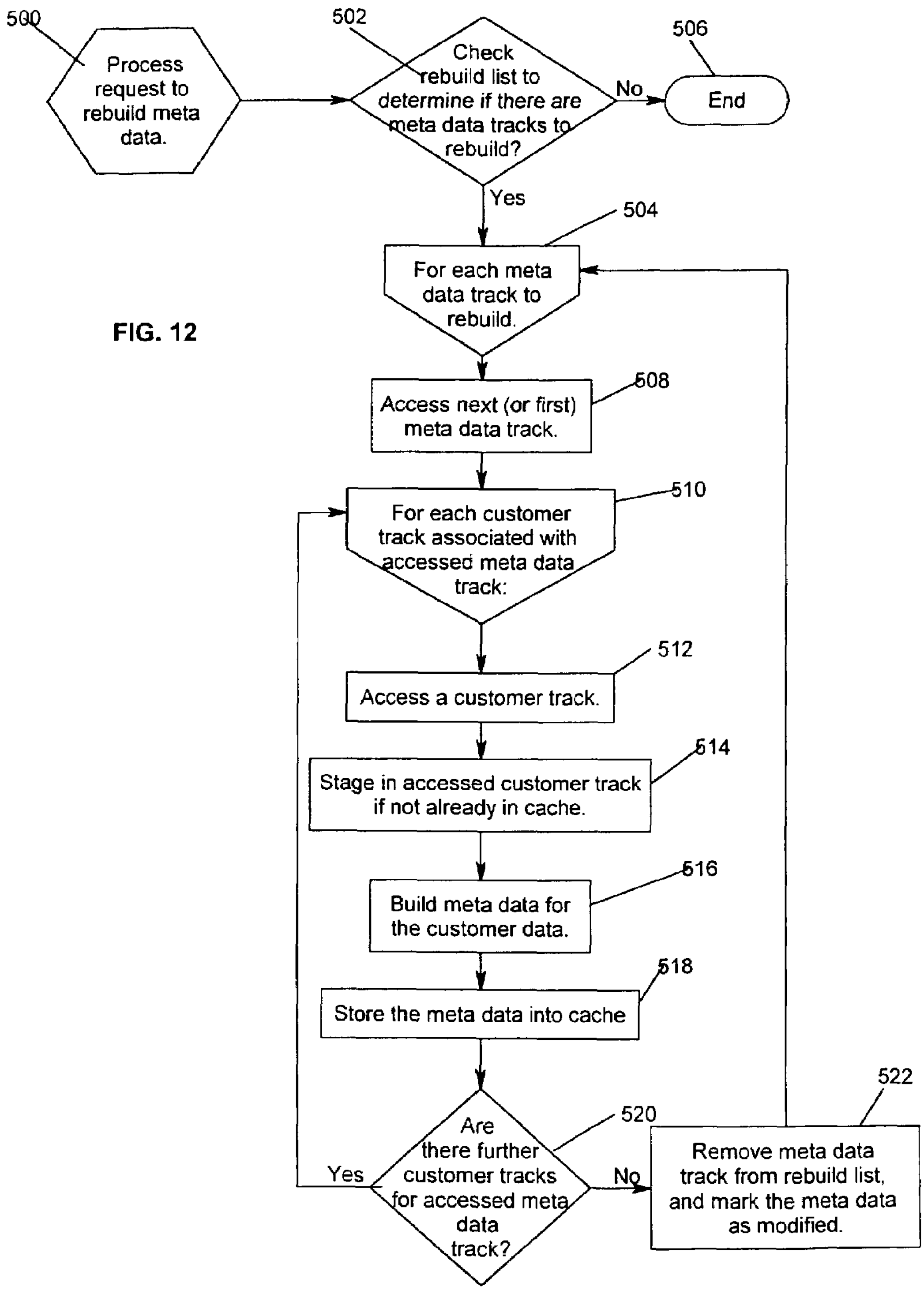
FIG. 12 illustrates logic to rebuild meta data in accordance with preferred embodiments of the present invention.

FIG. 12 illustrates logic implemented by the meta data manager function 22 to rebuild the meta data tracks indicated in the list of tracks to rebuild. Control begins at 500 where the meta data manager function 22 processes a request to rebuild the meta data tracks. Control transfers to block 502 which represents the meta data manager function 22 processing the rebuild list to determine whether there are meta data tracks 36 to rebuild. If so, control transfers to block 504; otherwise, control transfers to block 506 to end the process. At block 504, the meta data manager function 22 begins an outer loop to process each of the meta data tracks 36 on the rebuild list to rebuild. Within this outer loop, control transfers to block 508 to access a meta data track 36 from the rebuild list. The first time through the outer loop, the first track on the list is accessed. Thereafter, the next track on the list is accessed for each iteration of the outer loop. Control then transfers to block 510 to begin an inner loop to process each customer track that is represented by the meta data track 36 accessed at block 508 to rebuild. Within this inner loop, control transfers to block 512 to access a customer track represented by the accessed meta data track 36. Control then transfers to block 514 to stage in the accessed customer track into cache 28. Control then transfers to block 516 where the meta data manager function 22 rebuilds a portion of the modified meta data track 36 corresponding to the accessed customer data track. Control transfers to block 518 to then store the rebuilt meta data in cache 28.

Control then transfers to block 520 where the meta data function 22 determines whether there are further customer tracks associated with the accessed meta data track 36 to rebuild. If so, control transfers back to the start of the inner loop at 510 to process the next customer track. Otherwise, control transfers to block 522 to remove the accessed meta data track 36 just rebuilt from the rebuild list and then mark the meta data track 36 as modified for later destaging to the DASD 16. Control then returns to the start of the outer loop at 50 to access and process the next meta data track 36 on the rebuild list if there is another track on the rebuild list.

ALTERNATIVE EMBODIMENTS AND CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many markings may be made to this configuration without departing from the scope of the present invention.

The preferred embodiments were described with respect to a host 14 system and a storage controller 18. In alternative embodiments, the host 14 and storage controller 18 may be any processing unit types known in the art which manage and access meta data. In preferred embodiments, the meta data describes customer data on a DASD type device. In alternative embodiments, the meta data may describe any type of user data maintained on any type of non-volatile storage device, including disk drives, tape cartridges, optical disks, holographic units, etc.

The logic of FIGS. 3–12 may be implemented as microcode in a ROM of the storage controller 18 or as software logic that is part of the storage controller operating system or an application program.

In preferred embodiments, a host 14 may specify that the accessed meta data track 36 is to be placed at a specified location in the LRU list upon the end of access. In alternative embodiments, instead of modifying the order of the LRU list, two lists may be maintained, an accelerated list and a non-accelerated list. In such embodiments, the host 14 would specify one of the two lists.

Preferred embodiments have been described where the meta data in cache is validated using a LRC. In alternate embodiments of the present invention, other verification methods such as linear feedback shift registers may be used.

In summary, preferred embodiments disclose a method, system, and article of manufacture for managing meta data. The meta data provides information on data maintained in a storage device. The system receives a request for meta data from a process and determines whether the requested meta data is in cache. After determining that the requested meta data is not in cache, the system determines whether there are a sufficient number of allocatable segments in cache to stage in the meta data and allocates segments in cache to store the meta data after determining that there are enough allocatable segments in cache. The system stages the requested meta data into the allocated segments. In further embodiments, after determining that the requested meta data is in cache, the system determines whether a second process has exclusive access to the meta data in cache. After determining that the second process does not have exclusive access, the system indicates to the first process that access to the meta data is permitted. Otherwise, after determining that the second process has exclusive access, the system notifies the first process that access to the meta data track will be provided at a later time when the second process relinquishes exclusive access.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing meta data, wherein the meta data provides information on data maintained in a storage device, comprising the steps of:

receiving a request for meta data from a first process;

determining whether the meta data is in a cache;

determining whether a second process has exclusive access to the meta data in the cache after determining that the requested meta data is in the cache;

indicating to the first process that access to the meta data is permitted after determining that the second process does not have exclusive access; and notifying the first process that access to the meta data track will be provided at a later time when the second process relinquishes exclusive access after determining that the second process has exclusive access.

2. The method of claim 1, wherein the step of notifying the first process comprises the steps of:

determining whether the first process provided a callback function;

returning wait to notify the first process that access will be provided at a later time after determining that the callback function was provided; and returning fail to the host process after determining that a callback function was not provided, wherein the first process is not notified that access will be provided at a later time if fail is returned.

3. A method for managing meta data, wherein the meta data provides information on data maintained in a storage device, comprising:

receiving request for meta data from a first process;

determining whether the meta data is in a cache;

determining whether a second process has exclusive access to the meta data in the cache after determining that the requested meta data is in the cache;

indicating to the first process that access to the meta data is permitted after determining that the second process does not have exclusive access;

incrementing a value indicating a number of processes that have access to the meta data after determining that the second process does not have exclusive access; and notifying the first process that access to the meta data track will be provided at a later time when the second process relinquishes exclusive access after determining that the second process has exclusive access.

4. The method of claim 3, further comprising the steps of:

determining whether the requested meta data was previously modified after determining that the second process does not have exclusive access; and indicating that the meta data was modified after determining that the meta data was not modified, wherein the step of indicating to the first process that access to the meta data is permitted occurs after indicating that the meta data was modified.

5. The method of claim 4, further comprising the step of identifying the meta data in a non-volatile storage unit after indicating the meta data was modified.

6. A method for processing a request to end track access to a meta data track from a process, comprising:

providing a queue of access requests to a meta data track;

receiving a request from the process to terminate access to the meta data track;

determining whether the process requesting to terminate access has exclusive access to the meta data track;

processing the queue to select an access request;

granting access to the meta data track to the selected access request;

determining whether the selected access request is for exclusive access to the meta data track; and granting access to the meta data track to an additional selected access request in the queue after determining that the previous selected access request is not for exclusive access.

7. The method of claim 6, further comprising:

incrementing a value indicating a number of processes that have access to the meta data after granting access to the meta data track.

8. A method for managing meta data, wherein the meta data provides information on data maintained in a storage device, comprising:

receiving a request for meta data from a process performing an Input/Output (I/O) operation with respect to customer data, wherein the process uses the meta data to more efficiently process the customer data;

determining whether the requested meta data is available in a cache;

returning the requested meta data to the process if the meta data is available in the cache;

if the meta data is not available, determining whether the process indicated to wait for metadata; and if the process indicated to wait for metadata, then returning the requested meta data when the requested meta data becomes available in the cache.

9. The method of claim 8, further comprising:

if the process did not indicate to wait for metadata, then returning fail to the process if the meta data is not available.

10. The method of claim 8, further comprising:

returning wait to the process after determining that the process indicated to wait for meta data.

11. The method of claim 8, wherein the requested meta data is staged into cache if the process indicated to wait or not to wait for meta data to become available.

12. A system for managing meta data, wherein the meta data provides information on data maintained in a storage device, comprising:

a cache;

a control unit in communication with the cache;

control logic implemented within the control unit, comprising:

(i) means for receiving a request for meta data from a first process;

(ii) means for determining whether the meta data is in the cache;

(iii) means for determining whether a second process has exclusive access to the meta data in the cache after determining that the requested meta data is in the cache;

(iv) means for indicating to the first process that access to the meta data is permitted after determining that the second process does not have exclusive access; and (v) means for notifying the first process that access to the meta data track will be provided at a later time when the second process relinquishes exclusive access after determining that the second process has exclusive access.

13. The system of claim 12, wherein the control logic further includes; means for determining whether the first process provided a callback function;

means for returning wait to notify the first process that access will be provided at a later time after determining that the callback function was provided; and means for returning fail to the host process after determining that a callback function was not provided, wherein the first process is not notified that access will be provided at a later time if fail is returned.

14. A system for managing meta data, wherein the meta data provides information on data maintained in a storage device, comprising:

a cache;

a control unit in communication with the cache;

control logic implemented within the control unit, comprising:

(i) means for receiving a request for meta data from a first process;

(ii) means for determining whether the meta data is in the cache;

(iii) means for determining whether a second process has exclusive access to the meta data in the cache after determining that the requested meta data is in the cache;

(iv) means for indicating to the first process that access to the meta data is permitted after determining that the second process does not have exclusive access;

(v) means for incrementing a value indicating a number of processes that have access to the meta data after determining that the second process does not have exclusive access; and (vi) means for notifying the first process that access to the meta data track will be provided at a later time when the second process relinquishes exclusive access after determining that the second process has exclusive access.

15. The system of claim 14, wherein the control logic further includes:

means for determining whether the requested meta data was previously modified after determining that the second process does not have exclusive access; and means for indicating that the meta data was modified after determining that the meta data was not modified, wherein the step of indicating to the first process that access to the meta data is permitted occurs after indicating that the meta data was modified.

16. The system of claim 15, wherein the control logic further includes means for identifying the meta data in a non-volatile storage unit after indicating that the meta data was modified.

17. A system for processing a request to end track access to a meta data track from a process, wherein the meta data provides information on data maintained in a storage device, comprising:

a cache;

a control unit in communication with the cache;

control logic implemented within the control unit, comprising:

(i) means for providing a queue of access requests to a meta data track;

(ii) means for receiving a request from the process to terminate access to the meta data track;

(iii) means for determining whether the process requesting to terminate access has exclusive access to the meta data track;

(iv) means for processing the queue to select an access request;

(v) means for granting access to the meta data track to the selected access request;

means for determining whether the selected access request is for exclusive access to the meta data track; and (vi) means for granting access to the meta data track to an additional selected access request in the queue after determining that the previous selected access request is not for exclusive access.

18. The system of claim 17, wherein the control logic further comprises:

means for incrementing a value indicating a number of processes that have access to the meta data after granting access to the meta data track.

19. A system for managing meta data, comprising:

a cache;

a storage device, wherein the meta data provides information on data maintained in a storage device, a control unit in communication with the cache and the storage device;

control logic implemented within the control unit, comprising:

(i) means for receiving a request for meta data from a first process;

(ii) means for determining whether the meta data is in the cache;

(iii) means for determining whether a second process has exclusive access to the meta data in the cache after determining that the requested meta data is in the cache;

(iv) means for indicating to the first process that access to the meta data is permitted after determining that the second process does not have exclusive access; and (v) means for notifying the first process that access to the meta data track will be provided at a later time when the second process relinquishes exclusive access after determining that the second process has exclusive access.

20. The system of claim 19, wherein the control logic further includes:

means for determining whether the first process provided a callback function;

means for returning wait to notify the first process that access will be provided at a later time after determining that the callback function was provided; and mesas for returning fail to the host process after determining that a callback function was not provided, wherein the first process is not notified that access will be provided at a later time if fail is returned.

21. The system of claim 19, wherein the control logic further comprises:

means for incrementing a value indicating a number of processes that have access to the meta data after determining that a second process does not have exclusive access.

22. A system for processing a request to end track access to a meta data track from a process, comprising:

a cache;

a storage device, wherein the meta data provides information on data maintained in a storage device, a control unit in communication with the cache and the storage device;

control logic implemented within the control unit, comprising:

(i) means for providing a queue of access requests to a meta data track;

(ii) means for receiving a request from the process to terminate access to the meta data track;

(iii) means for determining whether the process requesting to terminate access has exclusive access to the meta data track;

(iv) means for processing the queue to select an access request;

(v) means for granting access to the meta data track to the selected access request;

means for determining whether the selected access request is for exclusive access to the meta data track; and means for granting access to the meta data track to an additional selected access request in the queue after determining that the previous selected access request is not for exclusive access.

23. The system of claim 22, wherein the control logic further comprises:

means for incrementing a value indicating a number of processes that have access to the meta data after granting access to the meta data track.

24. A data processing system for managing meta data, comprising:

a client computer;

a cache;

a storage device, wherein the meta data provides information on data maintained in a storage device, a control unit in communication with the cache, the storage device, and the client computer;

control logic implemented within the control unit, comprising:

(i) means for receiving a request for meta data from a first process related to a process initiated by the client computer;

(ii) means for determining whether the meta data is in the cache;

(iii) means for determining whether a second process related to a process initiated by the client computer has exclusive access to the meta data in the cache after determining that the requested meta data is in the cache;

(iv) means for indicating to the first process that access to the meta data is permitted after determining that the second process does not have exclusive access; and (v) means for notifying the first process that access to the meta data track will be provided at a later time when the second process relinquishes exclusive access after determining that the second process has exclusive access.

25. The system of claim 24, wherein the control logic further includes:

means for determining whether the first process provided a callback function;

means for returning wait to notify the first process that access will be provided at a later time after determining that the callback function was provided; and means for returning fail to the host process after determining that a callback function was not provided, wherein the first process is not notified that access will be provided at a later time if fail is returned.

26. The system of claim 24, wherein the control logic further comprises:

means for incrementing a value indicating a number of processes that have access to the meta data after determining that the second process does not have exclusive access.

27. A data processing system for processing a request to end track access to a meta data track from a process, comprising:

a client computer;

a cache;

a storage device, wherein the meta data provides information on data maintained in a storage device, a control unit in communication with the cache, the storage device, and the client computer;

control logic implemented within the control unit, comprising:

(i) means for providing a queue of access requests to a meta data track;

(ii) means for receiving a request from the process to terminate access to the meta data track;

(iii) means for determining whether the process requesting to terminate access has exclusive access to the meta data track;

(iv) means for processing the queue to select an access request;

(v) means for granting access to the meta data track to the selected access request;

(vi) means for determining whether the selected access request is for exclusive access to the meta data track; and (vii) means for granting access to the meta data track to an additional selected access request in the queue after determining that the previous selected access request is not for exclusive access.

28. The system of claim 27, wherein the control logic further comprises:

means for incrementing a value indicating a number of processes that have access to the meta data after determining that a second process does not have exclusive access.

29. A system for managing meta data, wherein the meta data provides information on data maintained in a storage device, comprising:

a cache;

a control unit in communication with the cache;

control logic implemented within the control unit to cause the control unit to perform:

(i) receiving a request for meta data from a process performing an Input/Output (I/O) operation with respect to customer data, wherein the process uses the meta data to more efficiently process the customer data;

(ii) determining whether the requested meta data is available in the cache;

(iii) returning the requested meta data to the process if the meta data is available in the cache;

(iv) if the meta data is not available, determining whether the process indicated to wait for metadata; and (v) if the process indicated to wait for metadata, then returning the requested meta data when the requested meta data becomes available in the cache.

30. The system of claim 29, further comprising:

if the process did not indicate to wait for metadata, then returning fail to the process if the meta data is not available.

31. The system of claim 29, further comprising:

returning wait to the process after determining that the process indicated to wait for meta data.

32. The system of claim 29, wherein the requested meta data is staged into cache if the process indicated to wait or not to wait for meta data to become available.

33. A system for managing meta data, comprising:

a cache;

a storage device, wherein the meta data provides information on data maintained in a storage device, a control unit in communication with the cache;

control logic implemented within the control unit to cause the control unit to perform:

(i) receiving a request for meta data from a process performing an Input/Output (I/O) operation with respect to customer data, wherein the process uses the meta data to more efficiently process the customer data;

(ii) determining whether the requested meta data is available in the cache;

(iii) returning the requested meta data to the process if the meta data is available in the cache;

(iv) if the meta data is not available, determining whether the process indicated to wait for metadata, and (v) if the process indicated to wait for metadata, then returning the requested meta data when the requested meta data becomes available in the cache.

34. The system of claim 33, further comprising:

if the process did not indicate to wait for metadata, then returning fail to the process if the meta data is not available.

35. The system of claim 33, further comprising:

returning wait to the process after determining that the process indicated to wait for meta data.

36. The system of claim 33, wherein the requested meta data is staged into cache if the process indicated to wait or not to wait for meta data to become available.

37. A data processing system for managing meta data, comprising:

a client computer;

a cache;

a storage device, wherein the meta data provides information on data maintained in a storage device, a control unit in communication with the cache, the storage device, and the client computer;

control logic implemented within the control unit to cause the control unit to perform:

(i) receiving a request for meta data from a process performing an Input/Output (I/O) operation with respect to customer data, wherein the process uses the meta data to more efficiently process the customer data;

(ii) determining whether the requested meta data is available in the cache;

(iii) returning the requested meta data to the process if the meta data is available in the cache;

(iv) if the meta data is not available, determining whether the process indicated to wait for metadata; and (v) if the process indicated to wait for metadata, then returning the requested meta data when the requested meta data becomes available in the cache.

38. The system of claim 37, further comprising:

if the process did not indicate to wait for metadata, then returning fail to the process if the meta data is not available.

39. The system of claim 37, further comprising:

returning wait to the process after determining that the process indicated to wait for meta data.

40. The system of claim 37, wherein the requested meta data is staged into cache if the process indicated to wait or not to wait for meta data to become available.

41. An article of manufacture for use in programming a control unit to manage meta data, wherein the control unit is in communication with a process, the article of manufacture comprising a computer usable medium including at least one computer program embedded therein that is capable of causing the control unit to perform the steps of:

receiving a request for meta data from a first process;

determining whether the meta data is in a cache;

determining whether a second process has exclusive access to the meta data in the cache after determining that the requested meta data is in the cache;

indicating to the first process that access to the meta data is permitted after determining that the second process does not have exclusive access; and notifying the first process that access to the meta data track will be provided at a later time when the second process relinquishes exclusive access after determining that the second process has exclusive access.

42. The article of manufacture of claim 41, wherein the step of notifying the first process comprises the steps of:

determining whether the first process provided a callback function;

returning wait to notify the first process that access will be provided at a later time after determining that the callback function was provided; and returning fail to the host process after determining that a callback function was not provided, wherein the first process is not notified that access will be provided at a later time if fail is returned.

43. An article of manufacture for use in programming a control unit to manage meta data, wherein the control unit is in communication with a process, the article of manufacture comprising a computer usable medium including at least one computer program embedded therein that is capable of causing the control unit to perform:

receiving a request for meta data from a first process;

determining whether the meta data is in a cache;

determining whether a second process has exclusive access to the meta data in the cache after determining that the requested meta data is in the cache;

indicating to the first process that access to the meta data is permitted after determining that the second process does not have exclusive access;

incrementing a value indicating a number of processes that have access to the meta data after determining that a second process does not have exclusive access; and notifying the first process that access to the meta data track will be provided at a later time when the second process relinquishes exclusive access after determining that the second process has exclusive access.

44. The article of manufacture of claim 43, wherein the computer program is further capable of causing the control unit to perform the steps of:

determining whether the requested meta data was previously modified after determining that the second process does not have exclusive access; and indicating that the meta data was modified after determining that the meta data was not modified, wherein the step of indicating to the first process that access to the meta data is permitted occurs after indicating that the meta data was modified.

45. The article of manufacture of claim 44, wherein the computer program is further capable of causing the control unit to perform the step of identifying the meta data in a non-volatile storage unit after indicating the meta data was modified.

46. An article of manufacture for use in programming a control unit to process a request to end track access to a meta data track from a process, wherein the control unit is in communication with the process, the article of manufacture comprising a computer usable medium including at least one computer program embedded therein that causes the control unit to perform the steps of:

providing a queue of access requests to a meta data track;

receiving a request from the process to terminate access to the meta data track;

determining whether the process requesting to terminate access has exclusive access to the meta data track;

processing the queue to select an access request;

granting access to the meta data track to the selected access request;

determining whether the selected access request is for exclusive access to the meta data track; and granting access to the meta data track to an additional selected access request in the queue after determining that the previous selected access request is not for exclusive access.

47. The system of claim 46, wherein the control logic further comprises:

means for incrementing a value indicating a number of processes that have access to the meta data after granting access to the meta data track.

48. An article of manufacture for use in programming a control unit to manage meta data, wherein the control unit is in communication with a process, the article of manufacture comprising a computer usable medium including at least one computer program embedded therein that is capable of causing the control unit to perform:

receiving a request for meta data from the process performing an Input/Output (I/O) operation with respect to customer data, wherein the process uses the meta data to more efficiently process the customer data;

determining whether the requested meta data is available in a cache;

returning the requested meta data to the process if the meta data is available in the cache;

if the meta data is not available, determining whether the process indicated to wait for metadata; and if the process indicated to wait for metadata, then returning the requested meta data when the requested meta data becomes available in the cache.

49. The article of manufacture of claim 48, further comprising:

if the process did not indicate to wait for metadata, then returning fail to the process if the meta data is not available.

50. The article of manufacture of claim 48, further comprising:

returning wait to the process after determining that the process indicated to wait for meta data.

51. The article of manufacture of claim 48, wherein the requested meta data is staged into the cache if the process indicated to wait or not to wait for meta data to become available.

* * * * *